US009194422B2

(12) United States Patent
Yoshino et al.

(10) Patent No.: US 9,194,422 B2
(45) Date of Patent: Nov. 24, 2015

(54) FOIL BEARING

(71) Applicants: Masato Yoshino, Mie (JP); Hiroki Fujiwara, Mie (JP)

(72) Inventors: Masato Yoshino, Mie (JP); Hiroki Fujiwara, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/346,034

(22) PCT Filed: Sep. 20, 2012

(86) PCT No.: PCT/JP2012/074028
§ 371 (c)(1),
(2) Date: Mar. 20, 2014

(87) PCT Pub. No.: WO2013/042713
PCT Pub. Date: Mar. 28, 2013

(65) Prior Publication Data
US 2014/0226925 A1 Aug. 14, 2014

(30) Foreign Application Priority Data

Sep. 22, 2011 (JP) .................................. 2011-207775
Sep. 18, 2012 (JP) .................................. 2012-204320

(51) Int. Cl.
F16C 32/06 (2006.01)
F16C 27/02 (2006.01)
F16C 17/02 (2006.01)

(52) U.S. Cl.
CPC ............... *F16C 27/02* (2013.01); *F16C 17/024* (2013.01); *F16C 2360/23* (2013.01)

(58) Field of Classification Search
CPC ..... F16C 17/024; F16C 27/02; F16C 2360/23
USPC .................. 384/100, 103–106, 114
See application file for complete search history.

(56) References Cited

U.S. PATENT DOCUMENTS 3,957,317 A * 5/1976 Silver ............................ 384/103
4,178,046 A 12/1979 Silver et al.
(Continued)

FOREIGN PATENT DOCUMENTS

JP 52-143356 11/1977
JP 2-20851 5/1990
(Continued)

OTHER PUBLICATIONS

International Search Report issued Dec. 11, 2012 in International (PCT) Application No. PCT/JP012/074028.
(Continued)

*Primary Examiner* — James Pilkington
(74) *Attorney, Agent, or Firm* — Wenderoth, Lind & Ponack, L.L.P.

(57) ABSTRACT

A foil bearing includes a cylindrical outer member, a shaft inserted on an inner periphery of the cylindrical outer member, and a plurality of leaves arranged at a plurality of positions in a circumferential direction between an inner peripheral surface of the cylindrical outer member and an outer peripheral surface of the shaft. A region including a front end of each of the plurality of leaves serves as a top foil that has a bearing surface, and a region including a rear end of each of the plurality of leaves serves as a back foil that supports, from behind, the top foil of an adjacent one of the plurality of leaves. Any one or both of the front end and the rear end of each of the plurality of leaves are inclined with respect to an axial direction.

20 Claims, 15 Drawing Sheets

(56) References Cited

U.S. PATENT DOCUMENTS

| | | |
|---|---|---|
| 4,871,267 A | 10/1989 | Gu |
| 2011/0103725 A1 | 5/2011 | Omori |

FOREIGN PATENT DOCUMENTS

| | | | |
|---|---|---|---|
| JP | 3-504888 | | 10/1991 |
| JP | 4-54309 | | 2/1992 |
| JP | 2002-295467 | | 10/2002 |
| JP | 2002-364643 | | 12/2002 |
| JP | 2003-262222 | | 9/2003 |
| JP | 2009-299748 | | 12/2009 |
| JP | 2011-144845 | | 7/2011 |
| WO | WO2012/043416 | * | 4/2012 |

OTHER PUBLICATIONS

International Preliminary Report on Patentability and Written Opinion of the International Searching Authority issued Apr. 3, 2014 in International (PCT) Application No. PCT/JP2012/074028.

* cited by examiner

FOIL BEARING

BACKGROUND OF INVENTION

1. Field of Invention

The present invention relates to a foil bearing comprising a thin film foil member interposed between an inner peripheral surface of an outer member and an outer peripheral surface of a shaft.

2. Description of Related Art

Main shafts of turbo-machines (for example, a gas turbine and a turbocharger) are driven to rotate at high speed. Further, turbine blades mounted to the main shafts are exposed to high temperature. Thus, bearings for supporting those main shafts are required to endure severe environments involving high temperature and high speed rotation. As bearings for such use, an oil-lubricated rolling bearing or a hydraulic dynamic pressure bearing may be used. However, use of those bearings is restricted under such conditions that lubrication with a liquid such as a lubricating oil is difficult, that an auxiliary device of a lubricating oil circulatory system is difficult to provide separately in view of energy efficiency, and that shearing resistance of the liquid causes problems. Under the circumstance, attention has been focused on an air dynamic pressure bearing as a bearing suited to use under the above-mentioned conditions.

In general, the air dynamic pressure bearing has rigid bearing surfaces on both of a rotary side and a fixed side. However, in the air dynamic pressure bearing of this type, when stability limit is exceeded under a state in which management of radial bearing gaps that are formed between the bearing surfaces on the rotary side and the fixed side is insufficient, self-excited centrifugal whirling of a main shaft, which is called a whirl, is liable to occur. Thus, it is important to manage the gaps in accordance with operating rotational speeds. In particular, in environments involving drastic temperature changes as in the case of the gas turbine and the turbocharger, widths of the radial bearing gaps fluctuate due to thermal expansion, and hence the gaps are significantly difficult to manage with high accuracy.

There has been known a foil bearing as a bearing that is less liable to cause the whirl and allows the gaps to be easily managed even in the environments involving drastic temperature changes. The foil bearing has bearing surfaces formed of flexible thin films (foils) having low flexural rigidity and supports a load by allowing the bearing surfaces to be deflected. Normally, an inner peripheral surface of the bearing is formed of a thin plate called a top foil, and a spring-like member called a back foil is arranged on a radially outer side thereof. With this, a load on the top foil is elastically supported by the back foil. In this case, during rotation of the shaft, an air film is formed between an outer peripheral surface of the shaft and an inner peripheral surface of the top foil. With this, the shaft is supported in a non-contact manner.

The foils of the foil bearing are flexible, and hence appropriate radial bearing gaps are formed in accordance with operating conditions such as a rotation speed of a shaft, a load on the shaft, and an ambient temperature. Therefore, the foil bearing has a feature of excellent stability, and hence can be used at higher speed in comparison with general air dynamic pressure bearings. Further, radial bearing gaps in the general dynamic pressure bearings need to be managed on an order of one thousandth of the diameter of the shaft. For example, in a shaft having a diameter of approximately several millimeters, the radial bearing gaps of approximately several micrometers need to be constantly secured. Thus, in consideration of not only a manufacturing tolerance but also the thermal expansion in the drastic temperature changes, the gaps are difficult to strictly manage. Meanwhile, the foil bearing is advantageous in that radial bearing gaps only need to be managed to have a size of approximately several tens of micrometers, and hence the foil bearing can be easily manufactured and the bearing gaps can be easily managed.

As examples of such foil bearings, there have been publicly known a foil bearing in which the back foil is provided with cut-and-raised parts so as to elastically support the top foil (Patent Literature 1), a foil bearing in which a bearing foil is elastically supported by an elastic body formed of wires that are woven into a mesh form (Patent Literature 2), a foil bearing in which the back foil is provided with support portions that are held in contact with an inner surface of an outer race and are immovable in a circumferential direction, and elastic portions that are elastically deflected by contact pressure from the top foil (Patent Literature 3), and the like.

As another example of the various foil bearings, there has been provided a foil bearing called a leaf type including, instead of the back foil, leaf foils formed by dividing the top foil in the circumferential direction, which are provided at a plurality of positions in the circumferential direction while being partially overlapped with each other so that resilience is generated by the overlapped parts of the leaf foils. As examples of such leaf type foil bearings, there have been publicly known a leaf type foil bearing in which a fixed bearing ring is divided in the circumferential direction into a plurality of circular-arc annular members, one end of each of the foils is welded to a joint end portion of each of the circular-arc annular members, and Rayleigh steps are provided in a bent form to the foils (Patent Literature 4), a leaf type foil bearing in which leaves are each formed of a piezoelectric bimorph (Patent Literature 5), a leaf type foil bearing in which the leaf foils are each formed of a bimetal formed of metals of two types having different linear expansion coefficients (Patent Literature 6), and the like.

CITATION LIST

Patent Literature 1: Japanese Patent Application No. 2002-364643

Patent Literature 2: Japanese Patent Application No. 2003-262222

Patent Literature 3: Japanese Patent Application No. 2009-299748

Patent Literature 4: Japanese Examined Patent Publication No. Hei 02-20851

Patent Literature 5: Japanese Patent Application No. Hei 04-54309

Patent Literature 6: Japanese Patent Application No. 2002-295467

TECHNICAL PROBLEM

In the related-art leaf type foil bearings, radial bearing gaps between bearing surfaces provided to the leaves and the outer peripheral surface of the shaft gradually shrink toward a front end side of the leaves. Thus, fluid pressure in the bearing gaps is high on the front end side of the leaves and low on the rear end side of the leaves. As a result, high-pressure portions and low-pressure portions are formed alternately to each other in the circumferential direction, which may adversely affect rotational accuracy of the shaft.

SUMMARY OF INVENTION

In view of the circumstances, it is an object of the present invention to provide a leaf type foil bearing that is rotatable with high accuracy and adaptable to higher speed rotation.

SOLUTION TO PROBLEM

In order to achieve the above-mentioned object, according to one embodiment of the present invention, there is provided a foil bearing, comprising: a cylindrical outer member; a shaft inserted on an inner periphery of the cylindrical outer member; and leaves arranged at a plurality of positions in a circumferential direction between an inner peripheral surface of the cylindrical outer member and an outer peripheral surface of the shaft, the leaves each comprising a front end and a rear end that are spaced apart from each other in the circumferential direction, the front end serving as a free end, wherein a region comprising the front end of each of the leaves serves as a top foil portion that has a bearing surface, wherein a region comprising the rear end of each of the leaves serves as a back foil portion that supports, from behind, the top foil portion of an adjacent leaf wherein relative rotation of the shaft and the cylindrical outer member is supported by a fluid film formed in a radial bearing gap facing the bearing surface, and wherein any one or both of the front end and the rear end of each of the leaves are inclined with respect to an axial direction.

When the any one or both of the front end and the rear end of each of the leaves are inclined with respect to the axial direction, a pressure gradient in the axial direction can be generated in the radial bearing gap. Thus, pressure in the radial bearing gap can be distributed in further various patterns, with the result that the shaft can be more stably supported.

Further, a foil member, which comprises a coupling portion for coupling the plurality of leaves to each other and integrally comprises the plurality of leaves and the coupling portion, is arranged between the outer peripheral surface of the shaft and the inner peripheral surface of the cylindrical outer member. With this, a foil member comprising a plurality of leaves can be manufactured from a single belt-like foil. Thus, in comparison with the related art in which the plurality of leaves are mounted one by one to the cylindrical outer member, manufacturing cost and assembly cost of components can be reduced, and hence cost reduction of the foil bearing can be achieved.

The foil member has a shape of a cylinder with ends, and comprises: one end side in the circumferential direction, which is mounted to the cylindrical outer member or the shaft; and another end that serves as a free end. Further, a turning direction of the foil member from the one end toward the another end is set to be reverse to a direction from the rear end toward the front end of each of the plurality of leaves. With this, the foil member is not pulled together with the rotation of one of the shaft and the cylindrical outer member on the rotary side, and can be prevented from being rolled around the rotary side member.

As the foil bearing having the above-mentioned configuration, there is conceivable a foil bearing comprising a double-layer foil portion comprising a first foil and a second foil that are overlapped with each other in a radial direction, wherein the first foil comprises first leaves formed with slits that are provided to the first foil, wherein the second foil comprises second leaves formed with slits that are provided to the second foil, and wherein the first leaves are inserted between adjacent second leaves through spaces formed with the slits. With this, a top foil and a back foil can be formed while overlapping the first leaves and the second leaves partially with each other in the radial direction, with the result that a foil bearing comprising the first leaves and the second leaves that are integrated with each other can be efficiently manufactured. Further, the first leaves and the second leaves are arranged alternately to each other in the circumferential direction. With this, the top foil elastically supported by the back foil can be provided to each of the plurality of leaves.

The double-layer foil portion can be formed by turning a single foil member twice around the shaft. Alternatively, the double-layer foil portion may be formed by overlapping two cylindrical foil members with each other in the radial direction. Still alternatively, the double-layer foil portion may be formed by doubling over a single foil member and then rolling the same into a cylindrical shape, or by stacking two foil members and then rolling the same into a cylindrical shape.

The foil member may be formed by rolling a belt-like foil comprising a plurality of slits. The belt-like foil comprises: a belt-like portion that forms the coupling portion; and a plurality of tongue portions that form the plurality of leaves, the belt-like portion and the plurality of tongue portions being formed with the plurality of slits. The plurality of slits of the belt-like foil may comprise slits that divide the plurality of tongue portions and the belt-like portion from each other and that comprise corner portions each formed into a round shape. With this, when a tensile force is generated through sliding against the shaft during low speed rotation and applied to the plurality of leaves (tongue portions), stress concentration that may occur at the corner portions, can be reduced. As a result, a tensile strength of each of the plurality of leaves can be increased.

It is preferred that any one of the cylindrical outer member and the shaft serve as a fixed side member, another of the cylindrical outer member and the shaft member serve as a rotary side member, and frictional coefficients of at least two of a sliding portion between the fixed side member and the foil member, a sliding portion between the rotary side member and the foil member, and a sliding portion between parts of the foil member be set to be different from each other. In this case, coating is interposed in all or a part of the sliding portions.

When the sliding portion is provided between the fixed side member and the foil member, a degree of freedom of deformation of the bearing surface becomes higher, and hence greater vibration damping effect can be obtained. In this case, in consideration of the vibration damping effect that is obtained by the foil member, it is desired that the frictional coefficient of this sliding portion be set to be somewhat high. When first coating is formed on any one or both of two surfaces forming the sliding portion, through appropriate selection of a coating material, an optimum frictional force can be obtained at the sliding portion therebetween regardless of materials of the foil member and the fixed side member. As a result, a degree of freedom of design of the bearing becomes higher.

The sliding portion between the rotary side member and the foil member is formed under a state of low speed rotation immediately after actuation or immediately before stop. When second coating for reducing friction between the surfaces is formed on any one or both of two surfaces forming this sliding portion, friction torque generated immediately after the actuation or immediately before the stop is reduced. As a result, torque reduction can be achieved. Further, the bearing surface is protected, and hence abrasion of the bearing surface at the time of sliding contact can be suppressed.

It is desired that the first coating and the second coating be made of materials having different frictional coefficients. As the first coating and the second coating, any one of DLC coating, titanium aluminum nitride coating, and molybdenum disulfide coating can be selected. The DLC coating and the titanium aluminum nitride coating are hard coating. Therefore, using those coatings can realize low friction and an enhanced abrasion resistance. As a result, a bearing life can be prolonged.

The foil bearing as described above can be used for supporting a rotor of a turbo-machine.

Advantageous Effects of Invention

According to the present invention, a pressure gradient in the axial direction can be generated in the radial bearing gap. Thus, the shaft is rotatable with high accuracy, with the result that the foil bearing that is adaptable to higher speed rotation can be provided.

BRIEF DESCRIPTION OF DRAWINGS

FIG. 5b is a side view of FIG. 5a.

FIG. 19b is a partially enlarged view of FIG. 19a.

FIG. 20b is a partially enlarged view of FIG. 20a.

DESCRIPTION OF EMBODIMENTS

Now, description is made of embodiments of the present invention with reference to the drawings.

Figure 1:
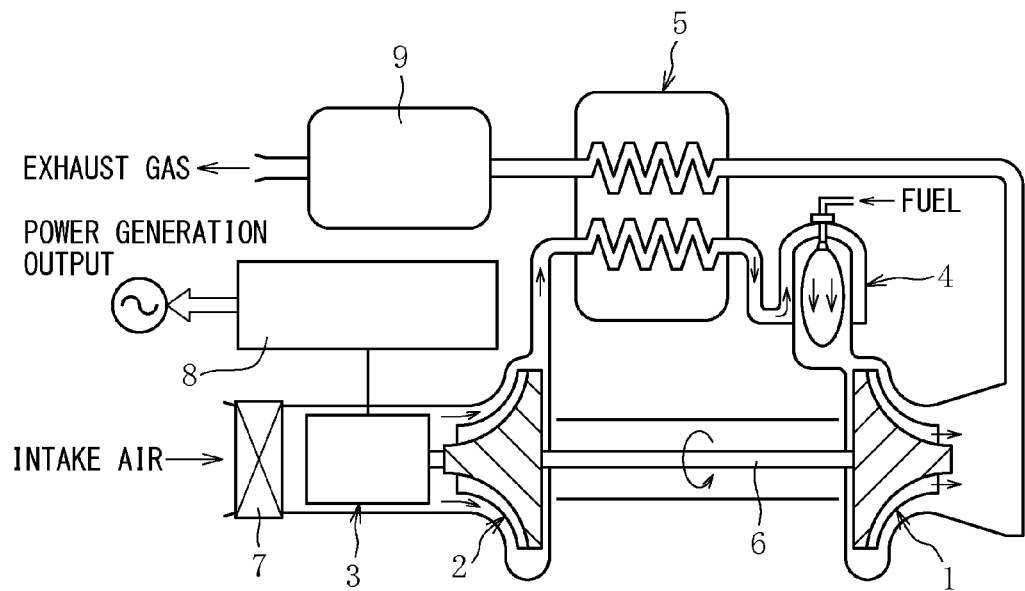
FIG. 1 is a schematic view of a configuration of a micro gas turbine.

FIG. 1 is a schematic view of a configuration of a gas turbine apparatus called a micro gas turbine as an example of a turbo-machine. The micro gas turbine mainly comprises a turbine 1 comprising a blade cascade, a compressor 2, a power generator 3, a combustor 4, and a regenerator 5. The turbine 1, the compressor 2, and the power generator 3 comprise a common shaft 6 extending in a horizontal direction. The shaft 6, the turbine 1, and the compressor 2 serve as an integrally rotatable rotor. Air sucked from an air-intake port 7 is compressed by the compressor 2, heated by the regenerator 5, and then fed into the combustor 4. The compressed air is mixed with fuel and combusted so as to rotate the turbine 1 with a high-temperature and high-pressure gas. A rotational force of the turbine 1 is transmitted to the power generator 3 through intermediation of the shaft 6 so as to rotate the power generator 3. In this way, electric power is generated and output through intermediation of an inverter 8. The gas having rotated the turbine 1 has a relatively high temperature. Thus, the gas is fed into the regenerator 5 so that heat thereof is exchanged with that of the compressed air prior to the combustion. In this way, the heat of the gas after the combustion is reused. The gas that has been subjected to the heat exchange in the regenerator 5 passes through an exhaust heat recovery device 9, and then is exhausted as an exhaust gas.

Figure 2:
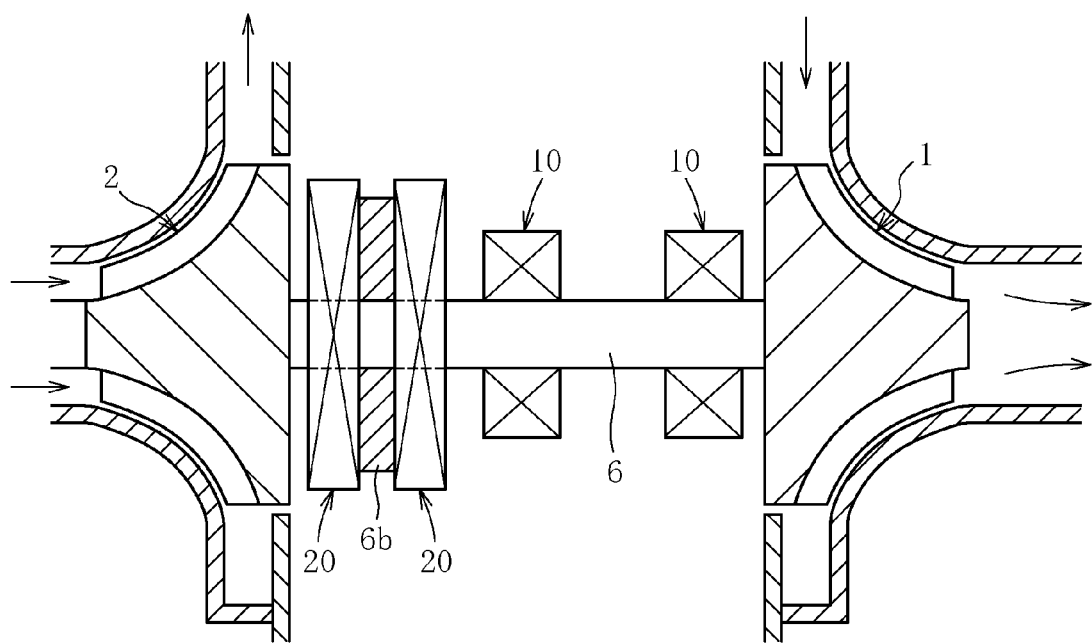
FIG. 2 is a sectional view of a support structure for a rotor of the micro gas turbine.

FIG. 2 illustrates an example of a support structure for the rotor of the micro gas turbine. This support structure comprises radial bearings 10 arranged at two positions in an axial direction, and thrust bearings 20 and 20 arranged on both sides in the axial direction of a flange portion 6b of the shaft 6. The radial bearings 10 and the thrust bearings 20 support the shaft 6 in a freely rotatable manner in a radial direction and both thrust directions.

In this support structure, a region between the turbine 1 and the compressor 2 is adjacent to the turbine 1 that is rotated by the high-temperature and high-pressure gas, and hence a temperature of an atmosphere therein is high. In this high-temperature atmosphere, a lubricant such as a lubricating oil and grease is deteriorated and evaporated. Thus, normal bearings (such as a rolling bearing) that use such lubricants are difficult to apply. Thus, air dynamic pressure bearings, in particular, foil bearings are suited to the bearings 10 and 20 that are used in the support structure of this type.

Now, description is made of a configuration of a leaf type foil bearing 10 that is suited to the radial bearings 10 for the micro gas turbine with reference to the drawings.

Figure 3:
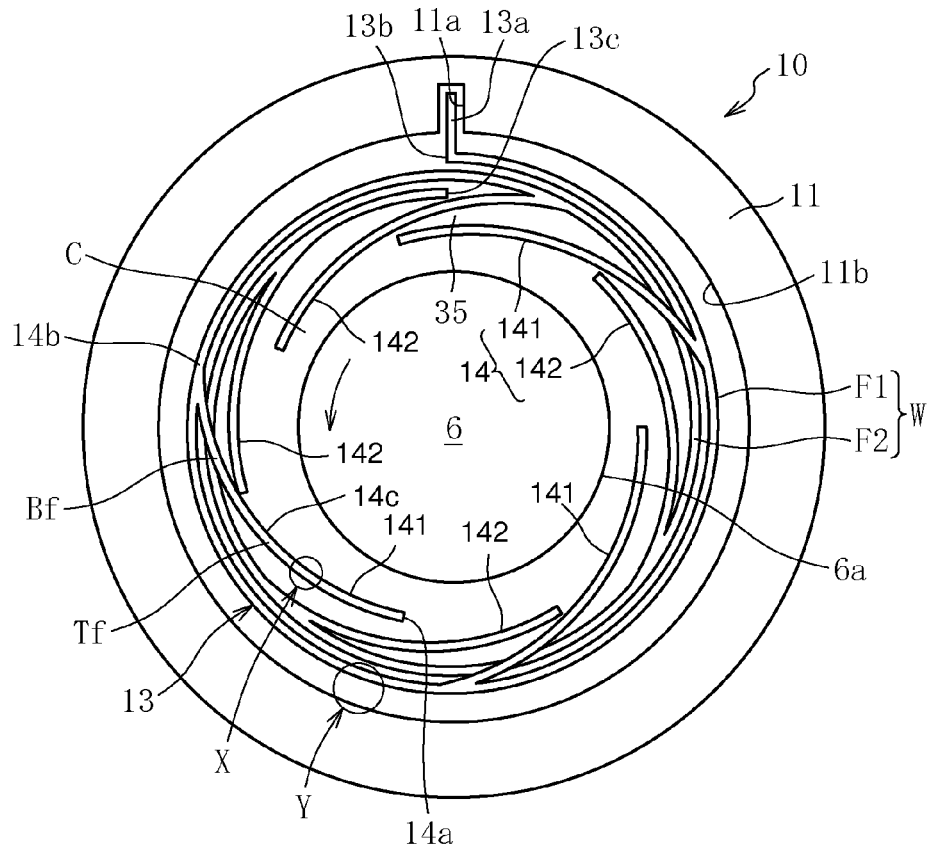
FIG. 3 is a front view of a foil bearing according to an embodiment of the present invention.

As illustrated in FIG. 3, the leaf type foil bearing 10 comprises a cylindrical outer member 11 fixed to an inner periphery of a housing (not shown), the shaft 6 inserted on an inner periphery of the outer member 11, and a cylindrical foil member 13 interposed between an inner peripheral surface of the outer member 11 and an outer peripheral surface of the shaft 6.

The foil member 13 has a form of a cylinder with ends, and comprises a plurality of leaves 14 at a plurality of positions in a circumferential direction. Both ends 13b and 13c of the foil member 13 are located at substantially the same position in the circumferential direction. One end 13b is mounted to the outer member 11 through intermediation of a mounting portion 13a. Another end 13c of the foil member 13 serves as a free end.

Figure 4:
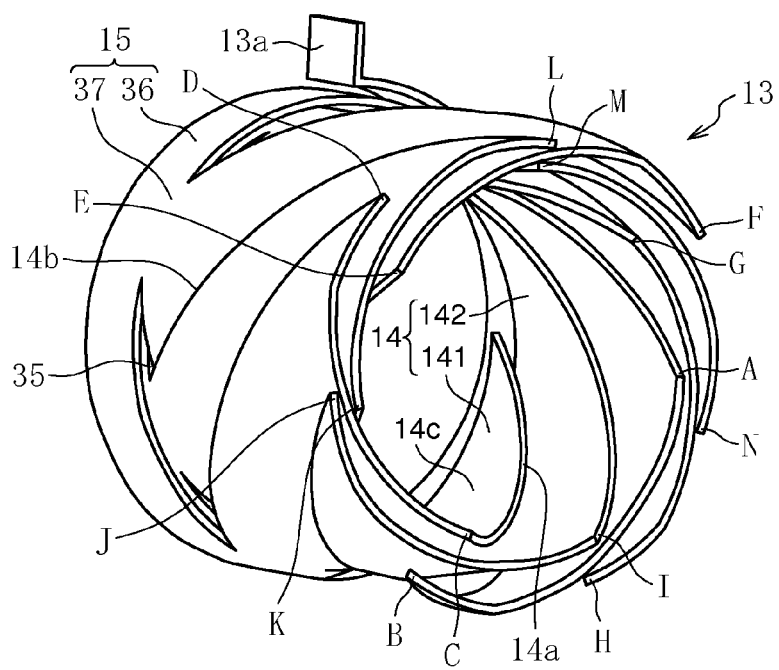
FIG. 4 is a perspective view of a foil member that is used in the foil bearing illustrated in FIG. 3.

The foil member 13 comprises a double-layer foil portion W formed substantially over the entire circumference thereof in a manner that foils are radially overlapped in two layers with each other. As illustrated in FIGS. 3 and 4, in the foil bearing of this embodiment, the foil member 13 is turned twice around the shaft 6. In this way, the double-layer foil portion W is formed of the single foil member 13. In the double-layer foil portion W, an outer foil F1 (first foil) is partially raised radially inward to form first leaves 141, and an inner foil F2 (second foil) is partially raised radially inward to form second leaves 142. The first leaves 141 and the second leaves 142 are arranged at an equiangular pitch.

The leaves 14 each have a front end 14a and a rear end 14b spaced apart from each other in the circumferential direction. The front end 14a is located at a position on a forward side in a rotational direction of the shaft 6 (direction of the arrow in FIG. 3) with respect to the rear end 14b. The front end 14a of each of the leaves 14 serves as a free end, and the rear end 14b thereof serves as a fixed end.

The leaves 14 each comprise a top foil portion Tf on the front end 14a side, and a back foil portion Bf on the rear end 14b side. The top foil portion Tf is overlapped (on a radially inner side) with the back foil portion Bf of another adjacent leaf 14 that is located on the forward side in the rotational direction. The back foil portion Bf elastically supports the top foil portion Tf. The top foil portion Tf has an inner peripheral surface that serves as a bearing surface 14c, and a wedge-like radial bearing gap C that shrinks in the rotational direction is formed between the bearing surface 14c and an outer peripheral surface 6a of the shaft 6.

The foil member 13 is formed of a belt-like foil made of a metal that is excellent in resiliency and processability, such as a steel material or a copper alloy, and having a thickness of from approximately 20 µm to 200 µm. As in this embodiment, in the air dynamic pressure bearing that uses air as a fluid film, a lubricating oil does not exist in an atmosphere, and hence a rust inhibiting effect by an oil cannot be expected. Carbon steel and brass can be taken as typical examples of the steel material and the copper alloy. However, general carbon steel is liable to corrode due to rust, and brass may be subjected to delayed cracking due to processing strain (this liability becomes higher in proportion to a Zn content in brass). Thus, it is preferred that the belt-like foil be made of stainless steel or bronze.

Now, description is made of a manufacturing procedure for the foil member 13 illustrated in FIG. 4. Note that, the terms "axial direction," "radial direction," and "circumferential direction" described in the following manufacturing procedure refer to an axial direction, a radial direction, and a circumferential direction under a state in which the foil member 13 that has been manufactured is incorporated on the inner periphery of the outer member 11. Specifically, the "circumferential direction" corresponds to a direction along a longitudinal side of a belt-like foil 30 as a preform, the "axial direction" corresponds to a direction that is orthogonal to the longitudinal side in a plane comprising the belt-like foil 30, and the "radial direction" corresponds to a thickness direction of the belt-like foil 30.

Figure 6A:
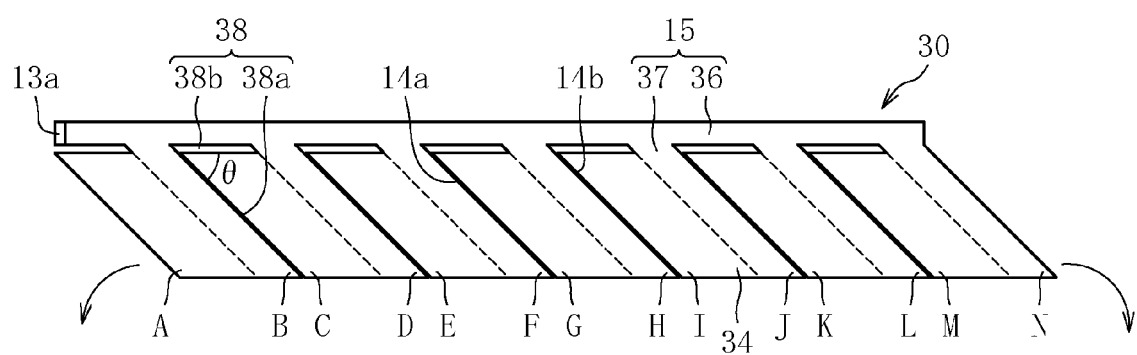
FIG. 6a is a plan view of a belt-like foil provided with slits.

As illustrated in FIG. 6(a), the belt-like foil 30, which is made of the metals exemplified above, is prepared, and then V-shaped slits 38 are formed at a plurality of positions at appropriate intervals along a lateral edge portion on one side in the axial direction through a wire cutting process or a pressing process. The slits 38 each comprise an inclined slit 38a inclined with respect to the axial direction, and a cutout circumferential slit 38b that is formed to be continuous with a terminal end of the inclined slit 38a and wider than the inclined slit 38a. The inclined slits 38a are parallel to each other, and an angle θ between each of the inclined slits 38a and the circumferential slits 38b that are continuous therewith is set to be acute. With those slits 38, a belt-like portion 36 that extends in the circumferential direction, and flap-like tongue portions 34 arrayed at a plurality of positions on one side in the axial direction of the belt-like portion 36 are provided to the belt-like foil 30. The belt-like portion 36 comprises a plurality of connecting portions 37 formed at an equiangular pitch in a form of being projected slightly in the axial direction, and the connecting portions 37 hold the tongue portions 34 integrally with the belt-like portion 36. Of the two sides of each of the tongue portions 34, which face each other in the circumferential direction, one side located on an opening side of the circumferential slit 38b serves as the front end 14a, and a side on an opposite side thereof serves as the rear end 14b.

Figure 6B:
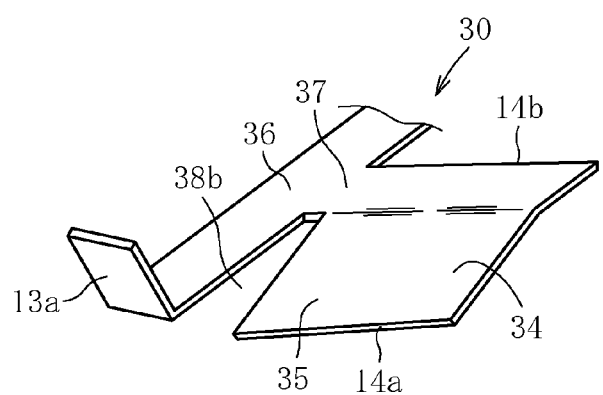
FIG. 6b is a perspective view of the foil under a state in which a tongue portion is bent after the formation of the slits.

Next, as illustrated in FIG. 6(b), the front end sides of the tongue portions 34 are bent in the same direction at bending lines that are parallel to the inclined slits 38a (indicated by broken lines in FIG. 6(a)). Then, under a state in which the tongue portions 34 bent in this way are directed radially inward, the belt-like foil 30 is curved in directions indicated by arrows in FIG. 6(a). In this way, the belt-like foil 30 is rolled into a double-layer spiral form. At the time of rolling a foil of a second turn, the tongue portions 34 of the second turn are inserted between adjacent tongue portions 34 of a foil of a first turn. The tongue portions 34 of the second turn are inserted through spaces 35 formed between the tongue portions 34 that are bent as described above. The tongue portions 34 are bent at the bending lines so as to allow the tongue portions 34 of the second turn to be smoothly introduced between the tongue portions 34 of the first turn. Thus, the bending operation of the tongue portions 34 may be omitted when not particularly necessary.

Through the procedure described above, the foil member 13 illustrated in FIG. 4 is manufactured. In FIG. 4, for the sake of better understanding, regions corresponding to corner portions A to N of the belt-like foil 30 illustrated in FIG. 6 are denoted by the same reference symbols A to N. In the foil member 13, the foil member 13 of the second turn serves as a first foil F1 on a radially outer side, and the tongue portions 34 provided to the first foil F1 serve as the first leaves 141. Further, the foil member 13 of the first turn serves as a second foil F2 on the radially inner side, and the tongue portions 34 provided to the second foil F2 serve as the second leaves 142. Except a vicinity of both the end portions 13b and 13c of the foil member 13, the first leaves 141 project between adjacent second leaves 142 through the opening portions 35 of the second foil F2. Thus, except the vicinity of both the end portions 13b and 13c of the foil member 13, the first leaves 141 and the second leaves 142 are arranged alternately to each other in the circumferential direction. The belt-like portion 36 of the belt-like foil 30 serves as a coupling portion 15, and the leaves 14 are integrally held in an elastically deformable manner by the coupling portion 15.

The one end 13b of the foil member 13 manufactured through the procedure described above is mounted to the outer member 11 under a state in which the foil member 13 is arranged on the radially inner side with respect to the outer member 11. In this way, the foil member 13 is fixed to the outer member 11. Specifically, in the above-mentioned step of manufacturing the foil member 13, the mounting portion 13a raised radially outward (refer to FIGS. 6(a) and 6(b)) is formed at one end portion of the belt-like foil 30, and the mounting portion 13a is fitted and fixed into a fitting groove 11a formed on the inner periphery of the outer member 11. In this way, the foil member 13 can be fixed to the outer member 11. The mounting portion 13a can be fixed into the fitting groove 11a by arbitrary fixing methods such as bonding and welding. After that, the shaft 6 is inserted on an inner periphery of the foil member 13. In this way, the foil bearing 10 illustrated in FIG. 3 can be obtained.

In the configuration described above, when the shaft 6 is rotated in a shrinkage direction of the wedge-like radial bearing gap C, air films are formed between the bearing surfaces 14c of the leaves 14 and the outer peripheral surface 6a of the shaft 6. With this, the wedge-like radial bearing gaps C are formed at a plurality of positions in the circumferential direction around the shaft 6, and the shaft 6 is supported in a freely rotatable manner in the radial direction under a non-contact state with respect to the foil member 13. Note that, widths of the radial bearing gaps C, which are actually as fine as approximately several tens of micrometers, are illustrated on an exaggerated scale in FIG. 3. Further, the foil member 13 is flexible, and hence the bearing surfaces 14c of the leaves 14 are arbitrarily deformed in accordance with operating conditions such as a load, a rotation speed of the shaft 6, and an ambient temperature. Thus, the radial bearing gaps C are automatically adjusted to have appropriate widths in accordance with the operating conditions. As a result, even under severe conditions involving high temperature and high speed rotation, the radial bearing gaps can be managed to have optimum widths, and hence the shaft 6 can be stably supported.

Figure 5A:
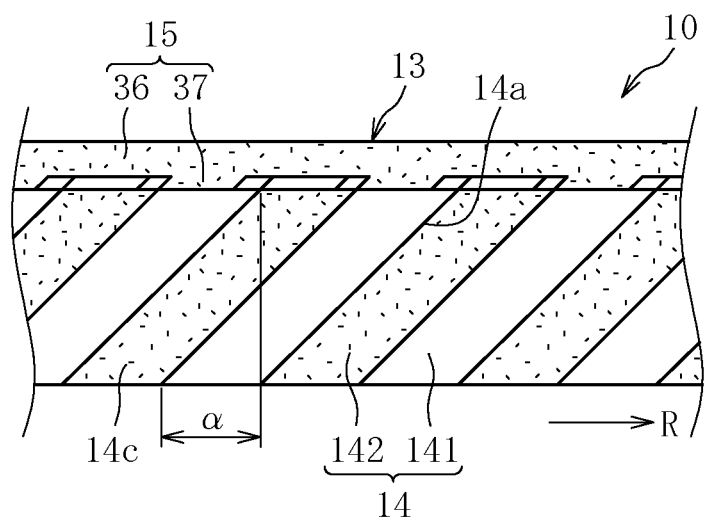
FIG. 5a is a planar developed view of the foil member as viewed from a radially inner side.
Figure 5B:
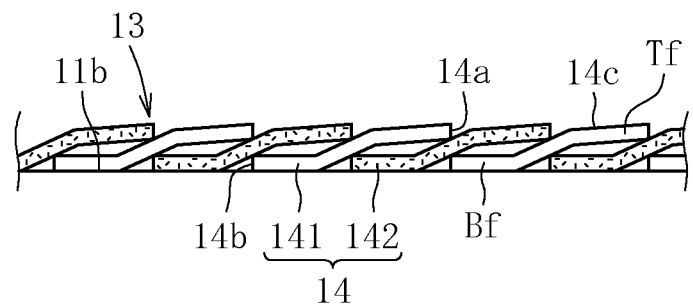

FIG. 5(a) is a developed view of the foil member 13 as viewed from the radially inner side of the foil bearing 10, and FIG. 5(b) is a side view in which the developed view of FIG. 5(a) is viewed from a lower side of FIG. 5(a) (opposite side in the axial direction with respect to the belt-like portion 36). In FIGS. 5(a) and 5(b), the first foil F1 is indicated by blank spaces, and the second foil F2 is indicated by a dotted pattern. As in the illustrated example, the front ends 14a and the rear ends 14b of the first leaves 141 and the second leaves 142 are inclined with respect to the axial direction (vertical direction in FIG. 5(a)). In this state, the leaves 141 and 142 are inclined in the same direction, and all the front ends 14a and the rear ends 14b are parallel to each other. The belt-like portions 36 of the first foil F1 and the second foil F2 are overlapped with each other in the radial direction.

As illustrated in FIG. 5(b), during rotation of the shaft 6, pressure generated in the radial bearing gaps C causes the back foil portions Bf of the leaves 14 to be pressed onto an inner peripheral surface 11b of the outer member 11. At this time, adjacent leaves 14 are deformed in conformity with the rear ends 14b of the back foil portions Bf, and hence the leaves 14 are deformed into a wave pattern. With this, steps in the radial direction (vertical direction in FIG. 5(b)) are formed at boundary portions between the top foil portions Tf and the back foil portions Bf of the leaves 14. Those steps are inclined with respect to the axial direction in conformity with shapes of the rear ends 14b. Thus, in the radial bearing gaps C during the rotation of the shaft 6, air flows are generated in the inclined directions along the steps.

When the front ends 14a of the leaves 14 are maintained in the inclined state in this way, high-pressure portions in the radial bearing gaps C during the rotation are formed along the front ends 14a of the leaves 14. With this, a pressure gradient in the axial direction can be generated in the circumferential wedge-like radial bearing gaps C, and the high-pressure portions near the front ends 14a can be distributed continuously in the circumferential direction. With this, the shaft 6 can be stably supported. Meanwhile, when the front ends 14a of the leaves 14 are formed parallel to the axial direction as in the related art, the pressure gradient in the axial direction is not generated, and the high-pressure portions are distributed intermittently in the circumferential direction. Thus, the shaft 6 is liable to cause vibration and the like, resulting in difficulty in achieving higher speed rotation.

Figure 22A:
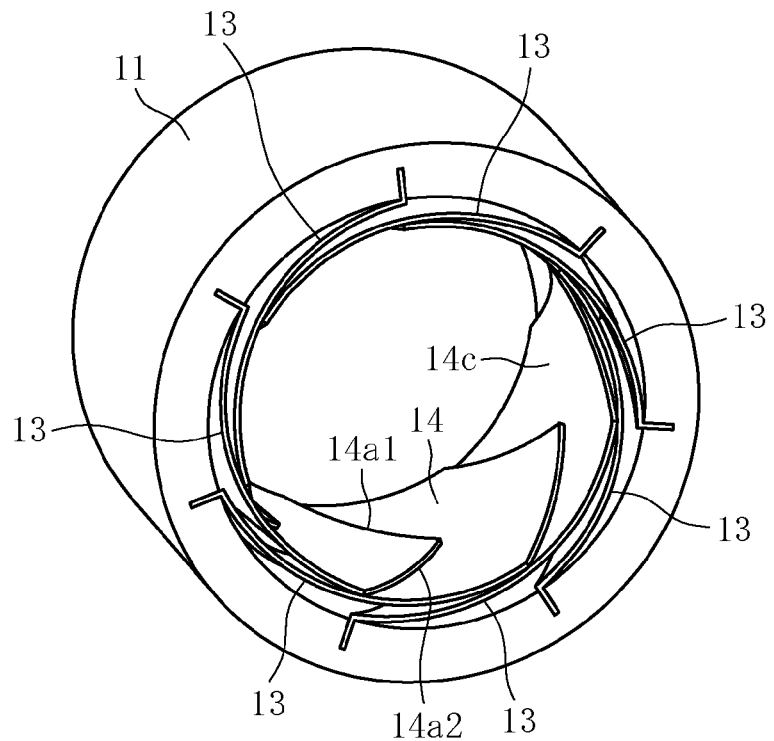
FIG. 22a is a perspective view of a foil bearing according to yet another embodiment of the present invention.
Figure 22B:
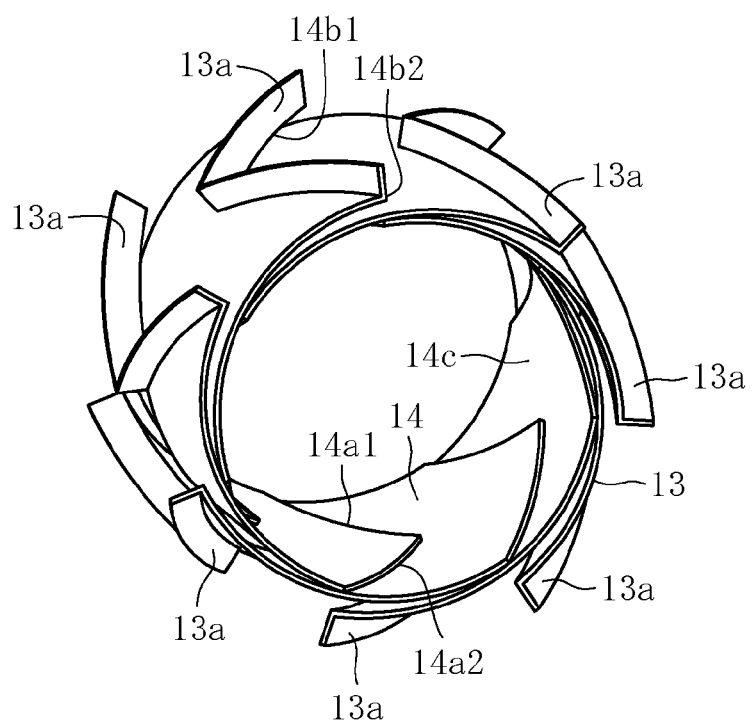
FIG. 22b is a perspective view of a foil assembly that is used in this foil bearing.

Further, the rear ends 14b of the leaves 14 are inclined in the same direction, and hence, as described above, the air flows in the inclined directions can be generated at the inclined boundary portions between the top foils Tf and the back foils Bf. When the rear ends 14b of the form illustrated in FIG. 5(a) and rear ends that are mirror-image symmetrical therewith are arrayed in the axial direction, and those rear ends are arranged in a direction in which the inclined air flows are merged, pressure in the radial bearing gaps C can be increased, to thereby increase load capacity. This advantage can be obtained not only in the case where the bearing surfaces 14c are arrayed in a double row, but also in a case where the bearing surfaces 14c are arrayed in a single row as illustrated in FIGS. 22(a) and 22(b).

In the configuration described above, as illustrated in FIG. 5, of the leaves 14 adjacent to each other, a rearmost end of a leaf 14 on the forward side in the rotational direction and a foremost end of another leaf 14 on a backward side in the rotational direction are overlapped with each other in a region a at a part in the circumferential direction, and thus the high-pressure portions can be seamlessly and continuously distributed overall between the bearing surfaces 14c. As a result, the shaft 6 can be much more stably supported.

Further, in the foil bearing according to the present invention, the leaves 14 are coupled to each other with the coupling portion 15, and the leaves 14 and the coupling portion 15 are integrally formed of the foil member 13. Thus, the foil member 13 can be manufactured from the single belt-like foil 30. In addition, the foil bearing 10 can be assembled only by mounting a single portion of the foil member 13 to the outer member 11. Thus, in comparison with the related art in which the leaves are mounted one by one to the outer member, manufacturing cost and assembly cost of components can be reduced, and hence cost reduction of the foil bearing can be achieved.

Still further, the first leaves 141 are introduced between adjacent second leaves 142 through the opening portions 35 of the second foil F2. Thus, the front end 14a side of each of the leaves 14 can be overlapped in the radial direction with the rear end 14b of another adjacent leaf on the forward side in the rotational direction. With this, the top foils Tf can be elastically supported from behind by the back foils Bf. Even when the leaves are formed by cutting and raising a plurality of portions in the circumferential direction only through a single turn of the foil member (corresponding to a form illustrated in FIG. 11(a) or FIG. 11(b)), the leaves 14 cannot be overlapped with each other. As a result, a function of the foil bearing cannot be obtained.

Figure 7A:
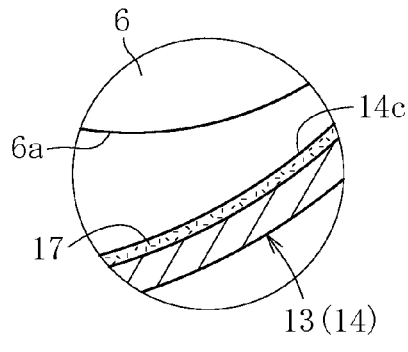
FIG. 7a is a sectional view illustrating the region X in FIG. 3 on an enlarged scale.

In the foil bearing 10, air films formed during low speed rotation immediately before stop of the shaft 6 or immediately after actuation of the shaft 6 are difficult to have a thickness equal to or larger than surface roughnesses around the bearing surfaces 14c of the leaves 14 and the outer peripheral surface 6a of the shaft 6. Thus, metal contact occurs between the bearing surfaces 14c of the leaves 14 and the outer peripheral surface 6a of the shaft 6, which causes an increase in torque. In order to reduce a frictional force generated at this time so that the torque is reduced, it is desired that any one or both of the bearing surfaces 14c and a surface of a member that slides against the bearing surfaces 14c (in this embodiment, the outer peripheral surface 6a of the shaft 6) be provided with coating 17 (second coating) for reducing friction of the surfaces. As an example, FIG. 7(a) illustrates a case where the second coating 17 is formed on the bearing surfaces 14c of the leaves 14. As the second coating 17, there may be used, for example, a DLC film, a titanium aluminum nitride film, or a molybdenum disulfide film. The DLC film and the titanium aluminum nitride film can be formed through CVD or PVD, and the molybdenum disulfide film can be easily formed through spraying. In particular, the DLC film and the titanium aluminum nitride film are hard. Thus, when the coating is formed of those films, abrasion resistance of the bearing surfaces 14c can also be enhanced. As a result, a bearing life can be prolonged.

Figure 7B:
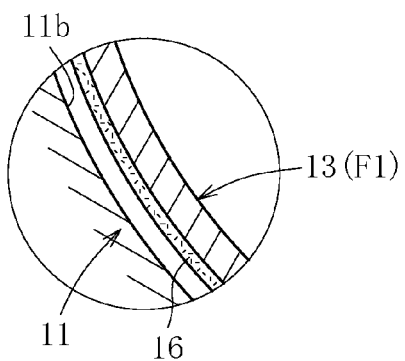
FIG. 7b is a sectional view illustrating the region Y in FIG. 3 on an enlarged scale.

Further, during operation of the bearing, due to influence of the air films formed in the radial bearing gaps, the foil member 13 is radially expanded overall to press the first foil F1, which is located on an outer side of the double-layer foil portion W, onto the inner peripheral surface 11b of the outer member 11. As a result, slight circumferential sliding occurs therebetween. As illustrated in FIG. 7(b), coating 16 (first coating) is formed on this sliding portion, that is, any one or both of an outer peripheral surface of the first foil F1 of the double-layer foil portion W and the inner peripheral surface 11b of the outer member 11, which is held in contact with the outer peripheral surface (as an example, FIG. 7(b) illustrates a case where the first coating 16 is formed on the outer peripheral surface of the first foil F1). With this, abrasion resistance at the sliding portion can be enhanced.

Note that, in order to achieve a greater vibration damping effect, a somewhat great frictional force may be necessary at this sliding portion. Thus, frictional property of the first coating 16 need not be significantly low. For those reasons, it is preferred that the DLC film and the titanium aluminum nitride film, which are larger in friction coefficient but higher in abrasion resistance than the molybdenum disulfide film, be used as the first coating 16. Specifically, the molybdenum disulfide film is used as the second coating 17 to be formed on the bearing surfaces 14c, and the titanium aluminum nitride, the DLC film, or the like is used as the first coating 16 to be formed on the sliding portion between the foil member 13 and the outer member 11. With this, frictional coefficients of both the coatings 16 and 17 can be set to be different from each other. As a result, lower torque and higher vibration damping property can be simultaneously obtained.

Further, during the operation of the bearing, parts of the foil member 13 (in particular, the leaves 14) slide against each other. Thus, the coating is formed on one or both of the two surfaces that form the sliding portion. With this, a degree of freedom of deformation of the bearing surfaces becomes higher, and hence a greater vibration damping effect can be obtained.

When frictional coefficients of at least sliding portions of two types that are arbitrarily selected from the sliding portions of the three types described above (sliding portion between the outer member 11 on the fixed side and the foil member 13, sliding portion between the shaft 6 on the rotary side and the foil member 13, and sliding portion between the parts of the foil member 13) are set to be different from each other, property of the foil bearing (such as abrasion resistance and vibration damping property) can be optimized in accordance with use conditions. The frictional coefficients can be set to be different from each other not only by forming coatings of different types on the sliding portions, but also by forming coating on only a part of the sliding portion without forming the coating on the rest of the sliding portion.

In the case exemplified in the above description, the shaft 6 serves as a rotary side member, and the outer member 11 serves as a fixed side member. However, the configuration of FIG. 3 may be applicable as it is also to a reverse case where the shaft 6 serves as a fixed side member, and the outer member 11 serves as a rotary side member. Note that, in this case, the foil member 13 serves as a rotary side member, and hence the foil member 13 needs to be designed in consideration of centrifugal deformation of the foil member 13 as a whole.

Figure 8:
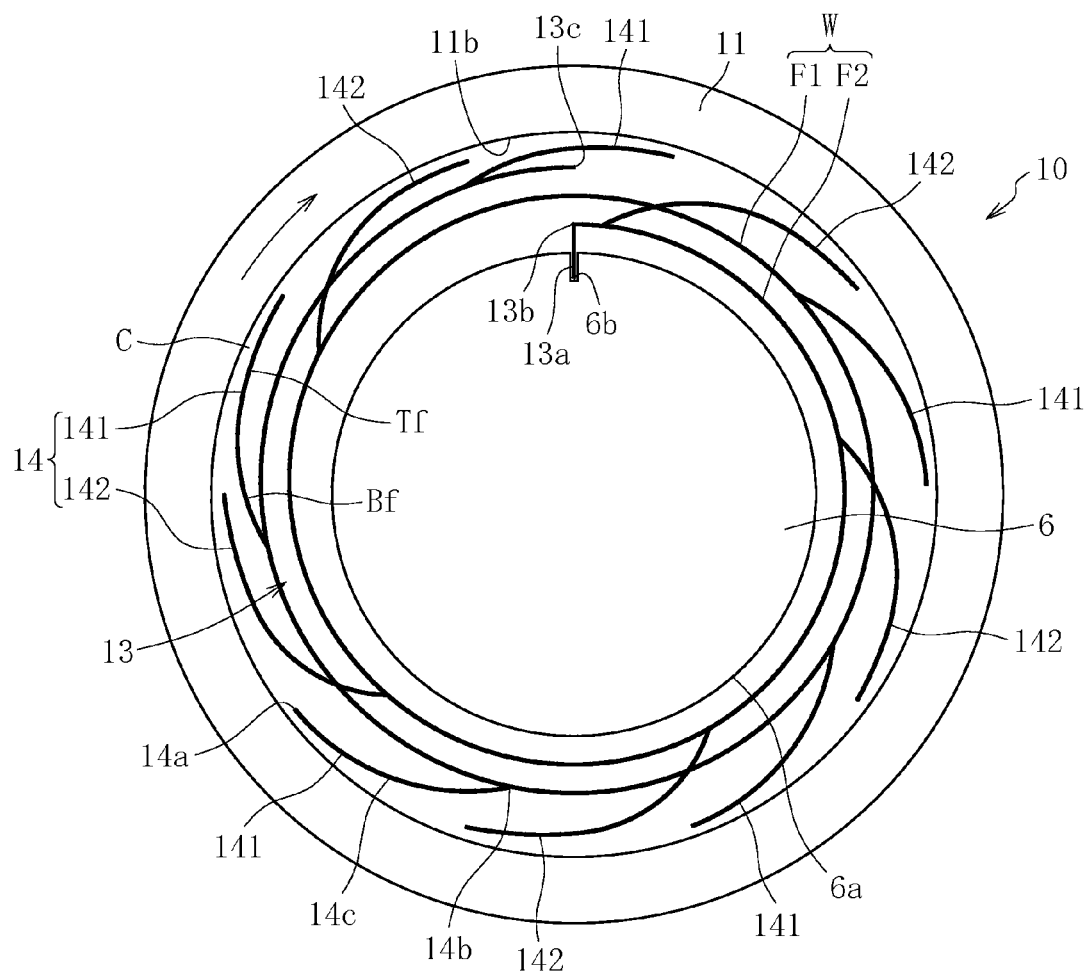
FIG. 8 is a front view of a foil bearing according to another embodiment of the present invention.

Further, in the case exemplified in FIG. 3, the foil member 13 is fixed to the outer member 11. However, the foil member 13 may be fixed to the shaft 6. As an example thereof, FIG. 8 illustrates a case where the mounting portion 13a at one end of the foil member 13 is projected radially inward, and fitted and fixed into a fitting groove 6b provided to the shaft 6. Alternatively, the mounting portion 13a may be fixed to the shaft 6 through bonding or welding.

In the foil bearing 10 according to another embodiment illustrated in FIG. 8, as in the embodiment illustrated in FIGS. 3 and 4, a single foil member 13 is turned twice to form the double-layer foil portion W comprising the two foils F1 and F2 that are overlapped with each other in the radial direction. The tongue portions 34 provided to the first foil F1 on the outer side of the double-layer foil portion W serve as the first leaves 141 each comprising the front end 14a as a free end, and the tongue portions 34 provided to the second foil F2 on an inner side thereof serve as the second leaves 142 each comprising the front end 14a as a free end.

Outer peripheral surfaces of the leaves 14 (first leaves 141 and second leaves 142) serve as the bearing surfaces 14c, and the wedge-like radial bearing gaps C are formed between the bearing surfaces 14c and the inner peripheral surface 11b of the outer member 11. During operation of the bearing, due to influence of the air films formed in the radial bearing gaps C, the foil member 13 radially shrinks overall to press the second foil F2, which is located on the inner side of the double-layer foil portion W, onto the outer peripheral surface 6a of the shaft 6. As a result, slight circumferential sliding occurs therebetween. Thus, the first coating 16 illustrated in FIG. 7(b) is formed on this sliding portion, that is, any one or both of an inner peripheral surface of the second foil F2 and the outer peripheral surface 6a of the shaft 6. The second coating 17 illustrated in FIG. 7(a) may be formed on any one or both of the bearing surfaces 14c and the inner peripheral surface 11b of the outer member 11, which slides against the bearing surfaces 14c.

The outer member 11 is provided on the rotary side in FIG. 8, but the outer member 11 may be provided on the fixed side. Note that, when the outer member 11 is provided on the fixed side, the foil member 13 is provided on the rotary side. Thus, the foil member 13 needs to be designed in consideration of centrifugal deformation of the first leaves 141 and the second leaves 142.

In the embodiments described above, the double-layer foil portion W is formed by turning the single foil member 13 twice around the shaft. However, the forming method for the double-layer foil portion W is not limited to the methods described above. For example, as in an embodiment illustrated in FIGS. 9 to 11, the double-layer foil portion W may be formed by coaxially fitting two foil members 13 each rolled into a cylindrical shape. Now, detailed description is made of this configuration.

Figure 9:
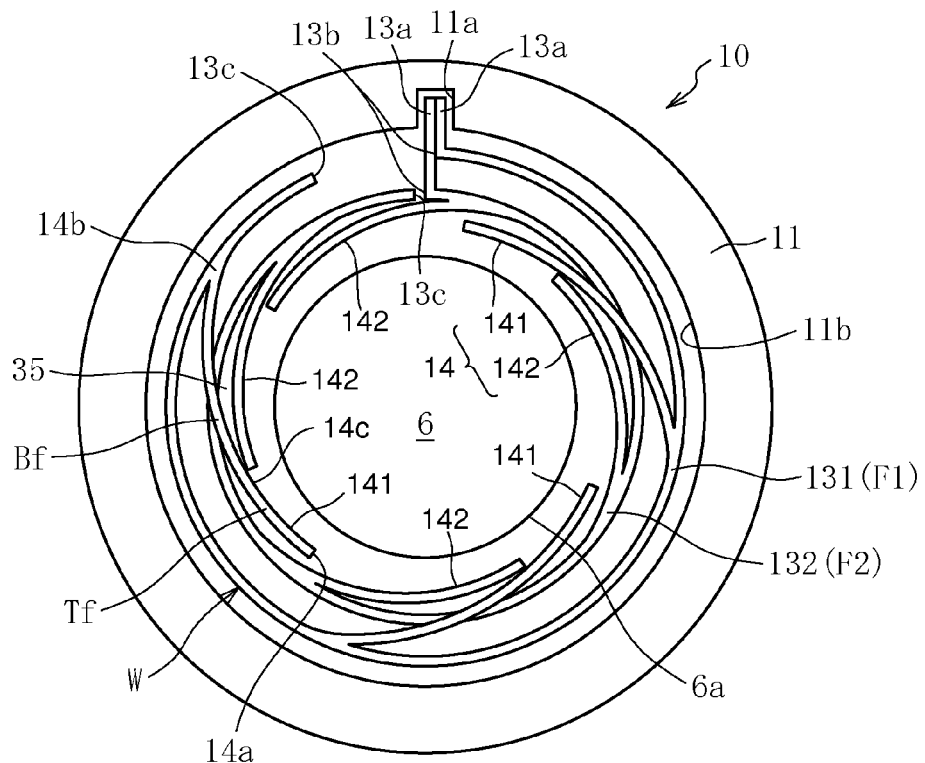
FIG. 9 is a front view of a foil bearing according to still another embodiment of the present invention.

In the leaf type foil bearing 10 illustrated in FIG. 9, a foil assembly comprising two cylindrical foil members 131 and 132 is arranged between the inner peripheral surface 11b of the outer member 11 and the outer peripheral surface 6a of the shaft 6. Similarly to the foil member 13 illustrated in FIGS. 3 and 4, the first foil member 131 and the second foil member 132 are each manufactured by a series of steps of forming the slits 38 into the metal belt-like foil 30 (refer to FIG. 6(a)), bending the tongue portions 34 (refer to FIG. 6(b)), and rolling the belt-like foil 30. Both the foil members 131 and 132 are each formed into the same shape, and comprise the mounting portion 13a formed at one end thereof. The belt-like foil 30 is turned once at the time of rolling, and both the ends 13b and 13c are arranged at substantially the same position in the circumferential direction.

Figure 11A:
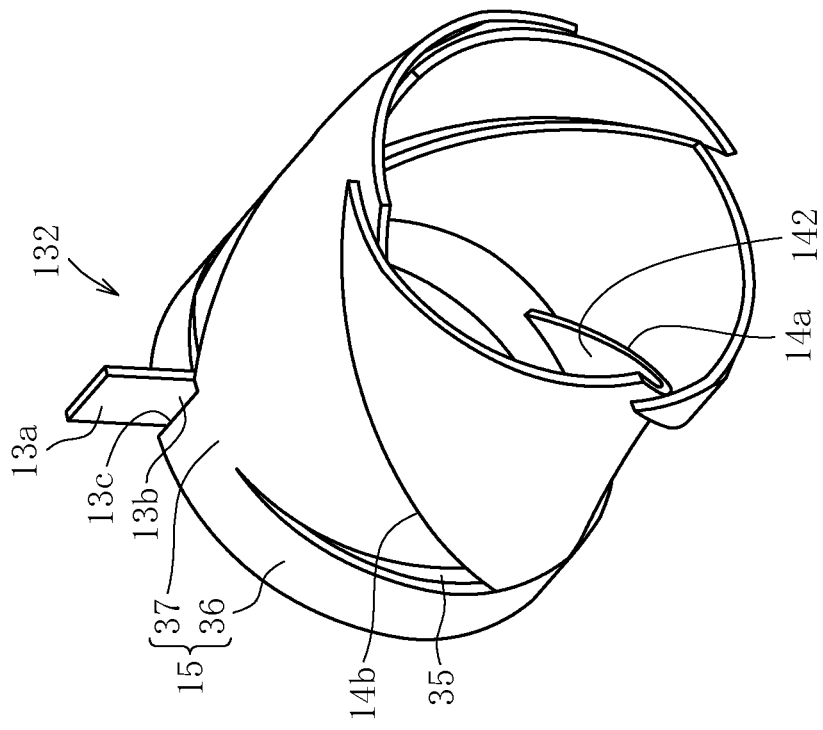
FIG. 11a is a perspective view of a first foil member of the foil assembly.
Figure 11B:
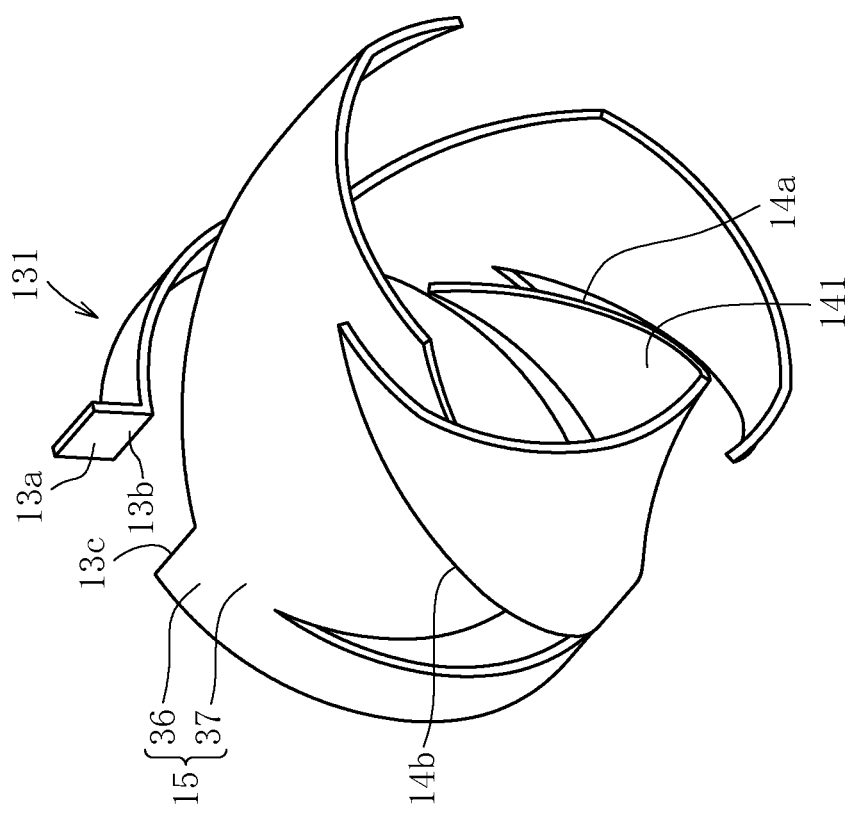
FIG. 11b is a perspective view of a second foil member.

Through the steps described above, the first foil member 131 illustrated in FIG. 11(a) and the second foil member 132 illustrated in FIG. 11(b) are obtained. The tongue portions 34 of the first foil member 131 serve as the first leaves 141, and the tongue portions 34 of the second foil member 132 serve as the second leaves 142. Further, the belt-like portion 36 of the belt-like foil 30 of each of both the foil members 131 and 132 comprises the coupling portion 15. The first foil member 131 integrally comprises the first leaves 141 and the coupling portion 15, and the second foil member 132 integrally comprises the second leaves 142 and the coupling portion 15.

Figure 10:
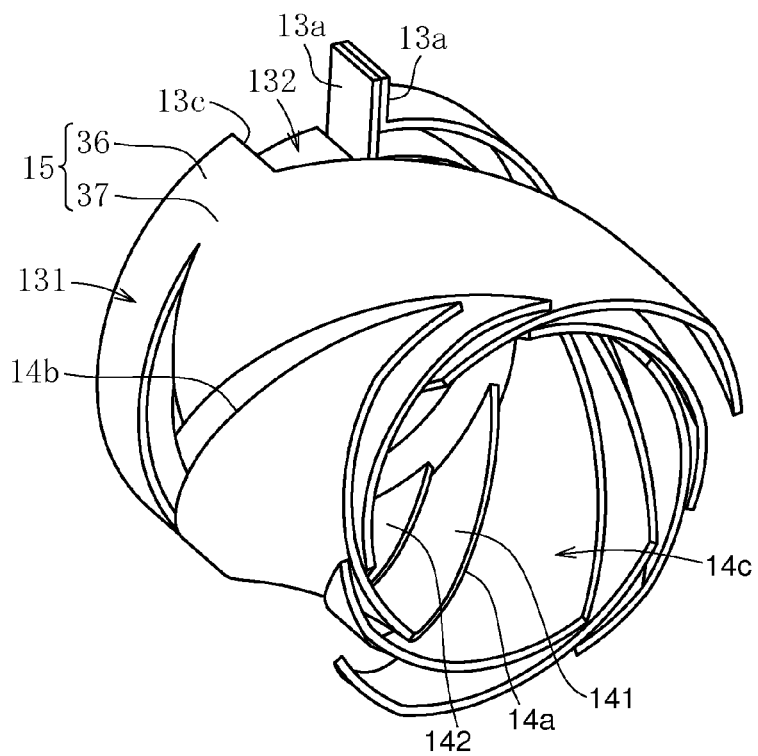
FIG. 10 is a perspective view of a foil assembly that is used in the foil bearing illustrated in FIG. 9.

The foil assembly illustrated in FIG. 10 is manufactured by fitting the second foil member 132 to an inner periphery of the first foil member 131 under a state in which a circumferential phase between the first foil member 131 and the second foil member 132 is shifted by an amount corresponding to ½ of a leaf pitch of one of the foil members. At this time, the first leaves 141 of the first foil member 131 are introduced between adjacent second leaves 142 through the opening portions 35 of the second foil member 132. With this, the first leaves 141 and the second leaves 142 can be arranged alternately to each other in the circumferential direction. The double-layer foil portion W comprises the first foil member 131 and the second foil member 132 that are overlapped with each other in the radial direction. Further, a region corresponding to each of the bearing surfaces 14c of the leaves 14 serves as the top foil Tf, and a region other than this region, that is, a region overlapped with the top foil Tf of an adjacent leaf serves as the back foil Bf. As in the embodiment illustrated in FIGS. 3 and 4, the front end 14a and the rear end 14b of each of the leaves 14 are inclined with respect to the axial direction.

This foil assembly is mounted to the outer member by, for example, fitting and fixing the mounting portion 13a of each of both the foil members 131 and 132 into the fitting groove 11a formed on the inner periphery of the outer member 11. As illustrated in FIG. 9, the two mounting portions 13a stacked on each other may be fixed into the common fitting groove 11a. Alternatively, although not shown, two fitting grooves 11a may be formed on the inner periphery of the outer member 11 so that the mounting portion 13a of the first foil member 131 is fixed into one of the fitting grooves 11a and the mounting portion 13a of the second foil member 132 is fixed into another of the fitting grooves 11a.

When the shaft 6 that is inserted on an inner periphery of the foil assembly is rotated in the shrinkage direction of the wedge-like radial bearing gaps C, air films are formed between the bearing surfaces 14c of the leaves 14 (first leaves 141 and second leaves 142) and the outer peripheral surface 6a of the shaft 6. With this, the wedge-like radial bearing gaps C are formed at a plurality of positions in the circumferential direction around the shaft 6. In this way, the shaft 6 may serve as a rotary side member, and the outer member 11 may serve as a fixed side member. Alternatively, the shaft 6 may reversely serve as a fixed side member, and the outer member 11 may reversely serve as a rotary side member. Further, as in the embodiment illustrated in FIG. 8, the foil assembly may be mounted to the shaft 6.

This leaf type foil bearing can be assembled only by manufacturing the two foil members 131 and 132 and mounting each single portion thereof to the outer member 11. Thus, in comparison with the related art in which the leaves are mounted one by one to the outer member, manufacturing cost and assembly cost of the components can be reduced, and hence cost reduction of the foil bearing can be achieved. Other functions and advantages are the same as those in the embodiment illustrated in FIGS. 3 and 4.

FIGS. 12(a) and 12(b) and FIGS. 13(a) and 13(b) illustrate other forming methods for the double-layer foil portion W.

Figure 12A:
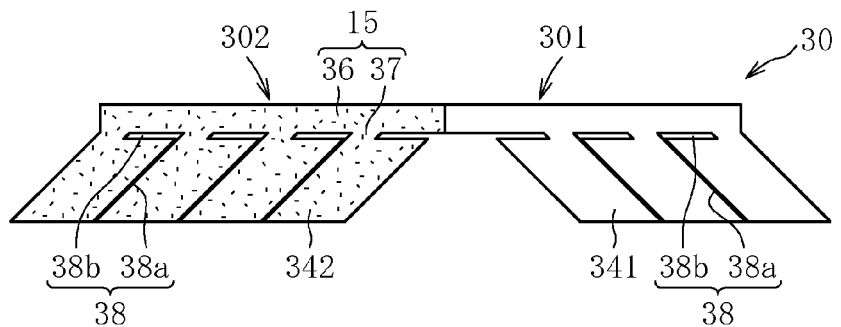
FIG. 12a is a plan view of a belt-like foil provided with slits, for illustrating another forming method for a double-layer foil portion.
Figure 12B:
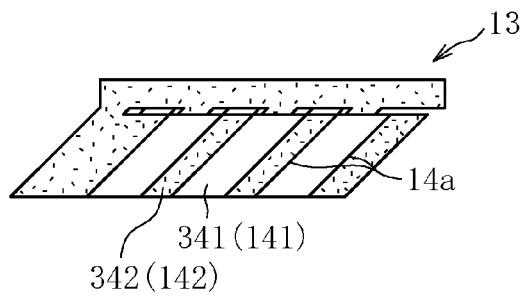
FIG. 12b is a plan view of the belt-like foil after being folded up, for illustrating the another forming method for the double-layer foil portion.

Of those drawings, FIGS. 12(a) and 12(b) illustrate a foil member 13 comprising the double-layer foil portion W, which is formed by doubling over the single belt-like foil 30 and then rolling the single belt-like foil 30 into a cylindrical shape. As illustrated in FIG. 12(a), the belt-like foil 30 comprises a first portion 301 (indicated by blank spaces) corresponding to the first foil F1 of the double-layer foil portion W, and a second portion 302 (indicated by a dotted pattern) corresponding to the second foil F2 of the double-layer foil portion W. The first portion 301 and the second portion 302 are arrayed in the circumferential direction, and both the portions 301 and 302 are formed integrally with each other. The first portion 301 and the second portion 302 each comprise the inclined slits 38a and the circumferential slits 38b so as to form tongue portions 341 and 342. The inclined slits 38a of the first portion 301 and the inclined slits 38a of the second portion 302 are inclined in directions opposite to each other. Thus, the front end 14a of each of the tongue portions 341 of the first portion 301 and the front end 14a of each of the tongue portions 342 of the second portion 302 are inclined in directions opposite to each other, and the rear ends 14b are also inclined in directions opposite to each other.

Next, as illustrated in FIG. 12(b), the belt-like foil 30 is doubled over by being bent at a boundary line between the first portion 301 and the second portion 302. Through this bending, the front end 14a of each of the tongue portions 341 of the first portion 301 and the front end 14a of each of the tongue portions 342 of the second portion 302 are parallel to each other. Similarly, the rear end 14b of each of the tongue portions 341 and the rear end 14b of each of the tongue portions 342 are also parallel to each other. After that, the tongue portions 341 of the first portion 301 are inserted between adjacent tongue portions 342 of the second portion 302. With this, the tongue portions 341 of the first portion 301 and the tongue portions 342 of the second portion 302 are arrayed alternately to each other. After that, the belt-like member 30 is rolled into a cylindrical shape so that the first portion 301 is located on the radially outer side. With this, the foil member 13 comprising the double-layer foil portion W is obtained.

In this case, the tongue portions 341 of the first portion 301 serve as the first leaves 141, and the tongue portions 342 of the second portion 302 serve as the second leaves 142. In this state, the front end 14a and the rear end (not shown) of each of the leaves 141 and 142 are inclined with respect to the axial direction. Thus, the same advantages as those in the embodiments described above are obtained. In the case exemplified in FIGS. 12(a) and 12(b), the total number of the leaves 14 is an odd number. Specifically, any one of the first portion 301 and the second portion 302 comprises an odd number of tongue portions, and another of the first portion 301 and the second portion 302 comprises an even number of tongue portions. However, the total number of the leaves 14 may be an even number, that is, the first portion 301 and the second portion 302 may comprise the same number of tongue portions.

Figure 13A:
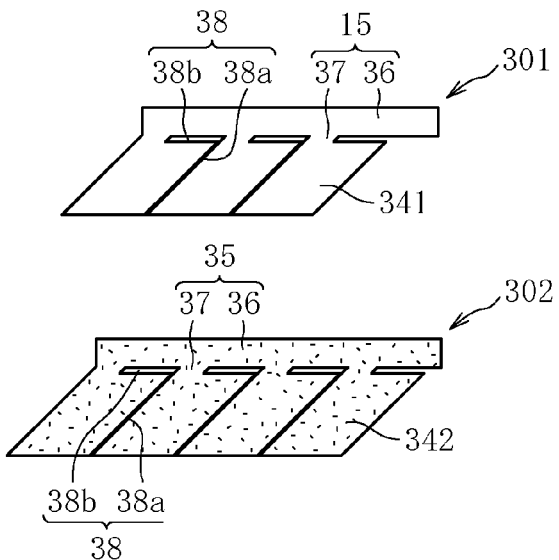
FIG. 13a is a plan view of two belt-like foils each provided with slits, for illustrating still another forming method for the double-layer foil portion.
Figure 13B:
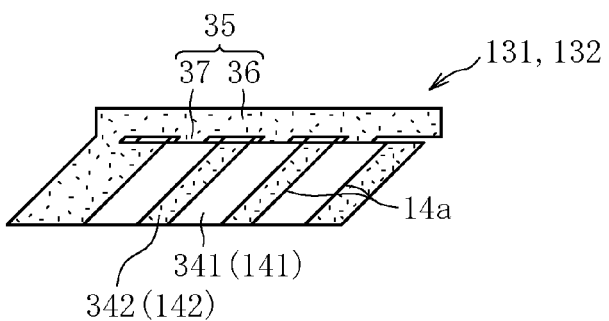
FIG. 13b is a plan view of the belt-like foils under a state of being stacked on each other, for illustrating the still another forming method for the double-layer foil portion.

FIGS. 13(a) and 13(b) illustrate a forming method for the double-layer foil portion W formed of the two foil members 131 and 132. The method comprises manufacturing the first portion 301 and the second portion 302 of the belt-like foil 30 illustrated in FIGS. 12(a) and 12(b) as separate members 301 and 302, stacking the two belt-like foils 301 and 302, and then rolling the two belt-like foils 301 and 302 into a cylindrical shape. Other structural details, and the functions and advantages are the same as those in the embodiment illustrated in FIGS. 12(a) and 12(b), and hence redundant description thereof is omitted.

In the foil bearings in the embodiments described above, as schematically illustrated in FIGS. 14(a) and 14(b), through sliding against a rotary side member (shaft member 6 in FIGS. 14(a) and 14(b)) at the time of stop or actuation, a sliding force P generated in a direction from the rear end 14b toward the front end 14a of the leaves 14 is applied to the leaves 14. Note that, for the sake of better understanding, in the case illustrated in FIGS. 14(a) and 14(b), the foil member 13 is turned only once.

Figure 14A:
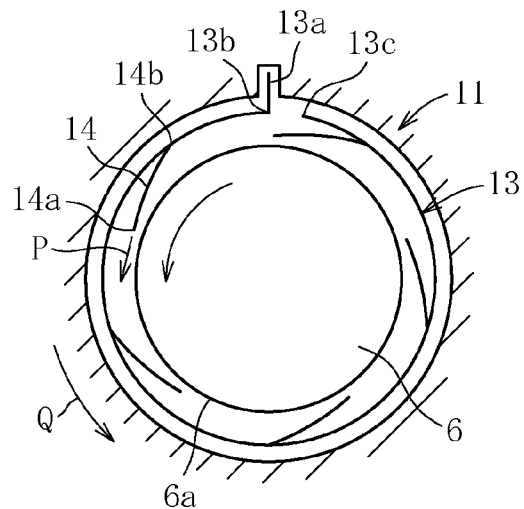
FIG. 14a is a front view of a schematic configuration of the foil bearing, for illustrating a case where an application direction of a sliding force P and a turning direction of the foil member are set to the same directions.

As in the present invention, in the configuration in which the leaves 14 and the coupling portions 15 are integrated with each other, the sliding force P is applied not only to the leaves 14 but also to the foil member 13 thereof. In this case, as illustrated in FIG. 14(a), when a turning direction Q from the one end 13b on the mounting side toward the another end 13c as a free end of the foil member 13 is the same as an application direction of the sliding force P, the foil member 13 may be rotated together with the shaft 6, and the foil member 13 may be rolled around the outer peripheral surface 6a of the shaft 6 depending on a use condition and a design condition of the bearing.

Figure 14B:
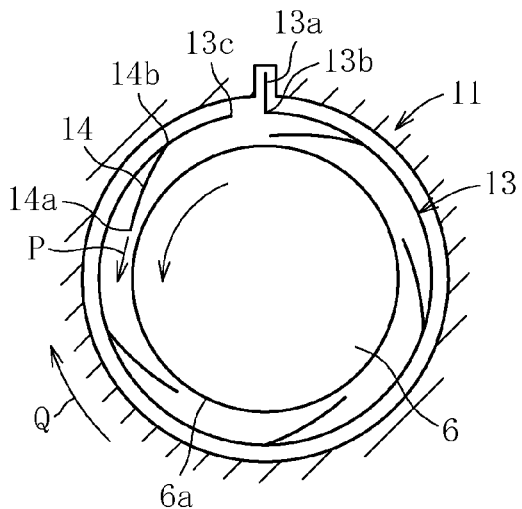
FIG. 14b is another front view of the schematic configuration of the foil bearing, for illustrating a case where the application direction of the sliding force P and the turning direction of the foil member are set to reverse directions.

Meanwhile, as illustrated in FIG. 14(b), when the turning direction Q of the foil member 13 is reverse to the application direction of the sliding force P, the foil member 13 is not rotated together with the shaft. Thus, the foil member 13 can be prevented from being rolled around the outer peripheral surface 6a of the shaft 6. For this reason, it is desired that the direction P from the rear end 14b toward the front end 14a of each of the leaves 14 and the turning direction Q from the one end 13b toward the another end 13c of the foil member 13 be set to reverse directions.

Figure 15:
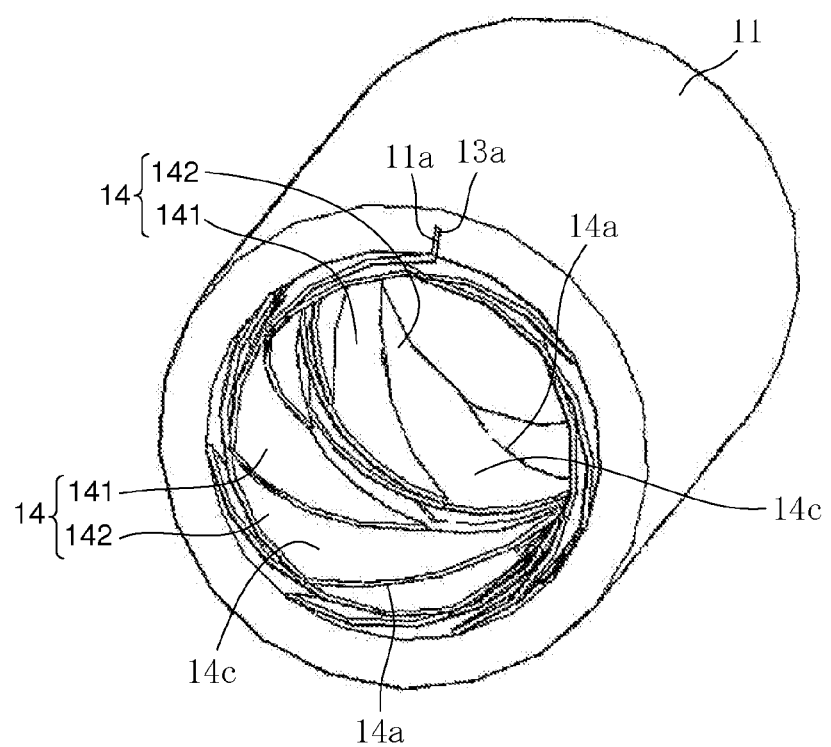
FIG. 15 is a perspective view of a foil bearing according to yet another embodiment of the present invention.
Figure 16:
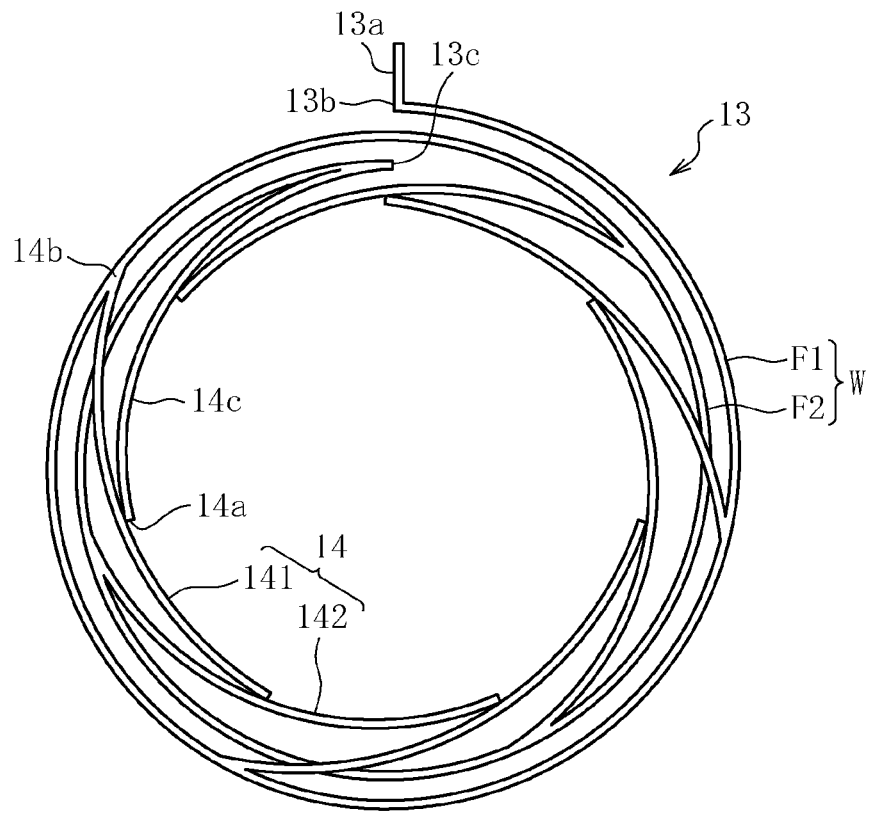
FIG. 16 is a front view of a foil member that is used in the foil bearing illustrated in FIG. 15.
Figure 17:
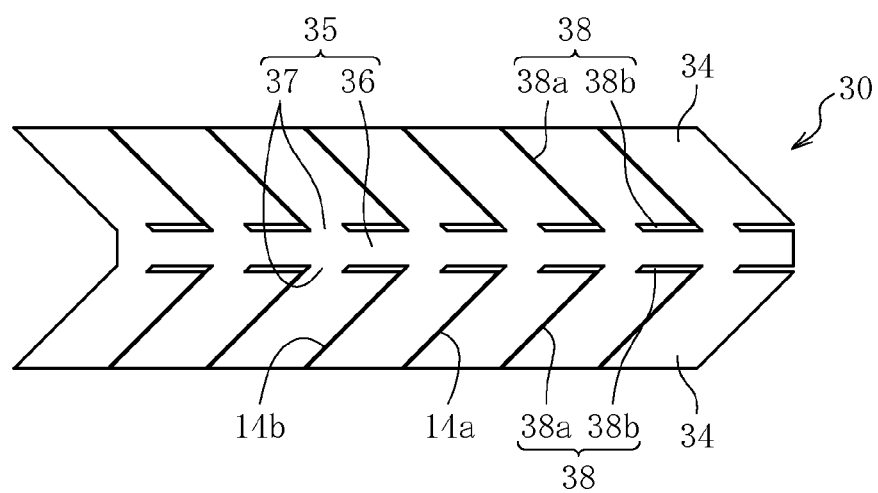
FIG. 17 is a plan view of a belt-like foil for forming the foil member of FIG. 16.

FIGS. 15 and 16 illustrate a double-row foil bearing in which the bearing surfaces 14c are formed in two regions in the axial direction. In this double-row foil bearing, as illustrated in FIG. 17, the inclined slits 38a and the circumferential slits 38b are formed on both sides in the axial direction of the belt-like foil 30 portion so as to form the tongue portions 34 on both the sides in the axial direction of the belt-like portion 36. This belt-like foil 30 is rolled into a cylindrical shape through the same procedure as that for the belt-like foil 30 illustrated in FIG. 6(a), and is mounted to the inner periphery of the outer member 11. With this, as illustrated in FIG. 15, leaf trains respectively comprising the first leaves 141 and the second leaves 142 are arranged on both the sides in the axial direction. As a result, a foil bearing having the double-row bearing surfaces 14c is obtained.

This double-row foil bearing has the double-row bearing surfaces 14c, and hence a moment load can be supported by a single bearing. In this case, the moment load can be supported by the single bearing 10, and hence the number of components can be reduced in comparison with a case where the moment load is supported by separate bearings. Further, the bearing surfaces 14c are formed in two regions within a single bearing, and hence centers thereof are less liable to be shifted to each other. As a result, the shaft 6 can be rotated with higher accuracy.

In addition, as illustrated in FIG. 15, a central side in the axial direction of the front end 14a of each of the leaves 14 on both the sides in the axial direction is inclined toward a forward side in the rotational direction. In this case, during the rotation of the shaft 6, air flows generated toward the central side in the axial direction are guided by inclined boundary portions between the top foils Tf and the back foils Bf. Thus, air can be prevented from being released from both the sides in the axial direction of the bearing. As a result, the pressure that is generated in the radial bearing gaps C can be increased, to thereby increase the load capacity.

In the double-row foil bearing in the case exemplified in the above description, the double-layer foil portion W is formed by turning the single foil member 13 twice around the shaft as illustrated in FIG. 4. However, the double-layer foil portion W is formed by arbitrary forming methods. The double-row foil bearing may be manufactured also by forming the belt-like foil used in the embodiment illustrated in FIG. 9 to FIGS. 11(a) and 11(b), the embodiment illustrated in FIGS. 12(a) and 12(b), or the embodiment illustrated in FIGS. 13(a) and 13(b) into a shape that conforms to a shape of the belt-like foil 30 illustrated in FIG. 17 through the manufacturing procedures of those embodiments.

FIGS. 18(a) to 18(g) illustrate other examples of the shape of each of the tongue portions 34 of the belt-like foil 30 for the double-row foil bearing illustrated in FIG. 17.

Figure 18A:
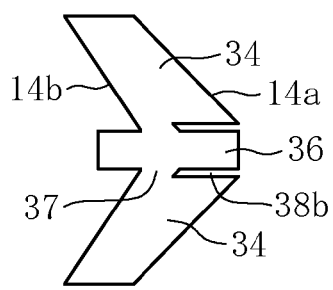
FIG. 18a is a plan view illustrating another example of the tongue portion provided to the belt-like foil.

In the example illustrated in FIG. 18(a) of those drawings, a circumferential length of each of the tongue portions 34 is set to be smaller on both bearing end sides than on the central side in the axial direction. In general, rigidities of the tongue portions 34 become higher in reverse proportion to circumferential widths of the tongue portions 34. Thus, when the circumferential length of each of the tongue portions is changed, the rigidity of each of the tongue portions 34 can be varied along the axial direction. In the configuration illustrated in FIG. 18(a), the rigidities of the tongue portions 34 become higher respectively on both the end sides in the axial direction thereof. In this case, the bearing surfaces 14c are less liable to be deformed at the high-rigidity parts, and hence a support span in the axial direction can be enlarged. In particular, a risk of a conical whirl of the shaft 6 can be reduced.

Figure 18B:
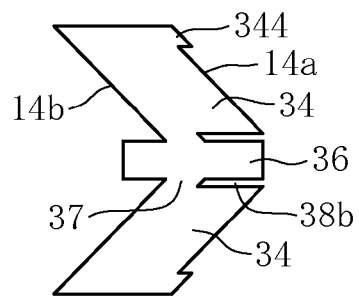
FIG. 18b is a plan view illustrating still another example of the tongue portion provided to the belt-like foil.

In the example illustrated in FIG. 18(b), the tongue portion 34 comprises barbs 344 provided on both the sides in the axial direction. As described above, the air flows in the inclined directions are generated in the radial bearing gaps C during the rotation of the shaft 6. However, a flow rate of the air flows that are released to an outside of the bearing can be reduced with the barbs 344 provided in this way. Thus, the pressure that is generated in the radial bearing gaps C can be increased, to thereby increase bearing load capacity.

Figure 18C:
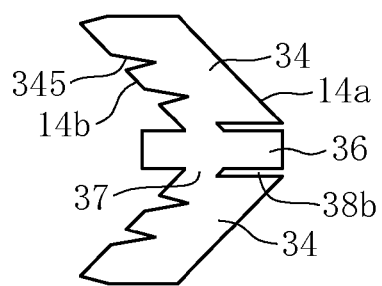
FIG. 18c is a plan view illustrating yet another example of the tongue portion provided to the belt-like foil.

In the example illustrated in FIG. 18(c), the rear end 14b of each of the tongue portions 34 comprises a slit 345 formed at a single position or a plurality of positions. With this, resilience of parts corresponding to the back foils Bf of each of the leaves 14 can be varied in the axial direction, and hence a gradient of the resilience of the back foils Bf can be formed in the axial direction. As a result, the bearing can be further variously designed. In particular, when resilience at bearing ends is reinforced (axial distance from the slit 345 to a foil edge is set to be large), the risk of the conical whirl of the shaft 6 can be reduced.

Figure 18D:
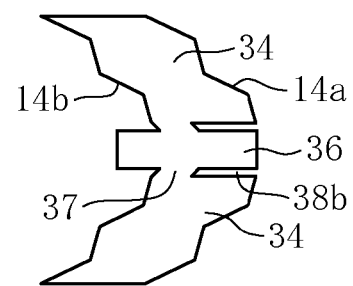
FIG. 18d is a plan view illustrating yet another example of the tongue portion provided to the belt-like foil.

In the example illustrated in FIG. 18(d), the front end 14a of each of the tongue portions 34 is formed into a non-linear shape comprising projections and depressions. With this, a circumferential length of foils overlapped with each other near the front end 14a can be changed, and hence the front end 14a of each of the leaves 14 can be adjusted in height. Thus, a circumferential gradient of each of the bearing surfaces 14c can be adjusted, and hence the bearing can be further variously designed.

Figure 18E:
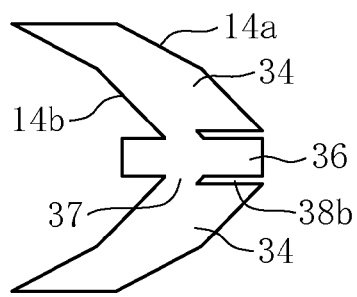
FIG. 18e is a plan view illustrating yet another example of the tongue portion provided to the belt-like foil.

In the example illustrated in FIG. 18(e), the front end 14a and the rear end 14b of each of the tongue portions 34 are each formed into a spiral shape. With this, a flow rate of the air flows in the inclined direction, which are generated in the radial bearing gaps C, is increased. As a result, pressure in the high-pressure portions can be increased, to thereby increase the load capacity.

Figure 18F:
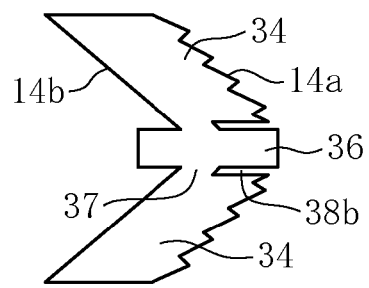
FIG. 18f is a plan view illustrating yet another example of the tongue portion provided to the belt-like foil.

In the example illustrated in FIG. 18(f), the front end 14a of each of the tongue portions 34 is formed into a zigzag shape. With this, a secondary flow can be actively formed in a rear space with respect to the front end 14a, to thereby increase the load capacity. This advantage can be obtained by forming at least the front end 14a into the zigzag shape regardless of a shape of the rear end 14b. Thus, in relation to the configuration in which the front end 14a and the rear end 14b are spaced apart from each other with the inclined slit 38a provided to the belt-like foil 30, the rear end 14b may be formed into a zigzag shape corresponding to that of the front end 14a.

Figure 18G:
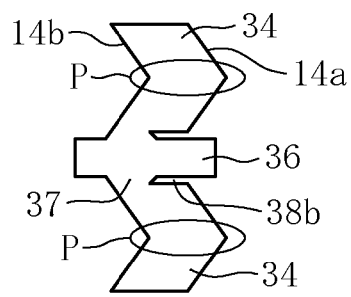
FIG. 18g is a plan view illustrating yet another example of the tongue portion provided to the belt-like foil.

In the example illustrated in FIG. 18(g), the front end 14a and the rear end 14b of each of the tongue portions 34 are formed into a herringbone shape. In this case, during the rotation of the shaft 6, air flows gather to a bent part of each of the tongue portions 34, and hence high-pressure portions P are formed at two positions spaced apart from each other in the axial direction. Thus, in particular, the risk of the conical whirl of the shaft 6 can be reduced.

The belt-like foil 30 exemplified in the above description with reference to FIGS. 18(a) to 18(g) is used for double-row foil bearings. Note that, when there is no particular problem, the tongue portions 34 of the belt-like foil 30 of the single-row foil bearing 10 as in the embodiment illustrated, for example, in FIGS. 3 and 4 may be formed into the same shapes as those illustrated in FIGS. 18(a) to 18(g).

Figure 19A:
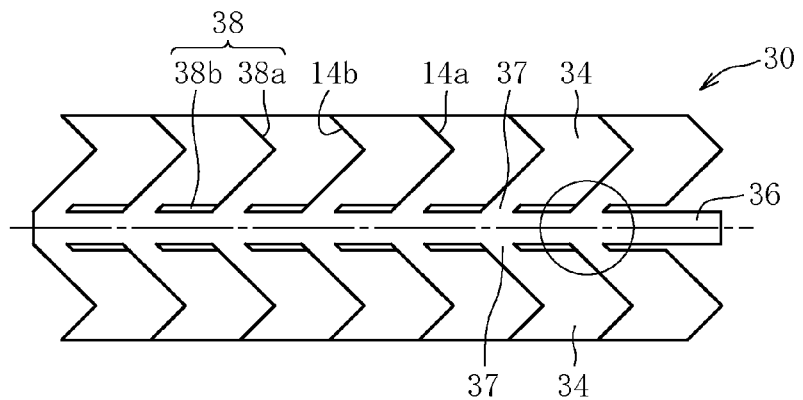
FIG. 19a is a plan view of a double-row belt-like foil comprising tongue portions of the form illustrated in FIG. 18(g).
Figure 19B:
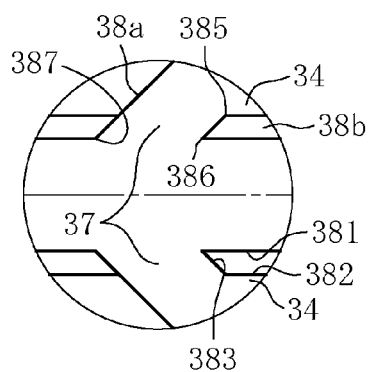

FIG. 19(a) is a plan view of the double-row belt-like foil 30 comprising the tongue portions 34 in the form illustrated in FIG. 18(g), and FIG. 19(b) is a partially enlarged view of the double-row belt-like foil 30. As illustrated in FIGS. 19(a) and 19(b), the circumferential slits 38b that divide the tongue portions 34 and the belt-like portion 36 of the belt-like foil 30 from each other each comprise a first edge 381 and a second edge 382 that are parallel to each other, and a third edge 383 that connects the two edges 381 and 382 to each other. Here, the first edge 381 corresponds to an edge of the belt-like portion 36, the second edge 382 corresponds to an edge of the tongue portion 34, and the third edge 383 corresponds to an edge of the connecting portion 37.

As described above, during high speed rotation of the foil bearing, air films are formed between the shaft 6 and the leaves 14, and the shaft 6 and the leaves 14 are maintained in a non-contact state. Meanwhile, during low speed rotation at the time of the stop or the actuation, the leaves 14 of the foil member 13 slide against the outer peripheral surface of the shaft 6, and a tensile force toward the rotational direction of the shaft 6 is applied to the leaves 14. As illustrated in FIG. 19(b), when a corner portion 385 between the second edge 382 and the third edge 383 and a corner portion 386 between the first edge 381 and the third edge 383 are angular, stress concentration is liable to occur due to the tensile force, which may result in breakage of the foil member 13. This stress concentration may occur also at a corner portion 387 between a terminal end of the inclined slit 38a and the first edge 381 of the circumferential slit 38b that is continuous with the inclined slit 38a.

Figure 20A:
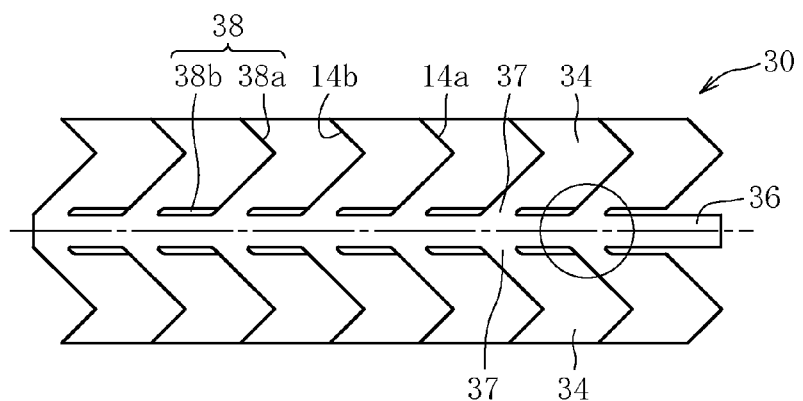
FIG. 20a is a plan view of another double-row belt-like foil comprising the tongue portions of the form illustrated in FIG. 18(g).
Figure 20B:
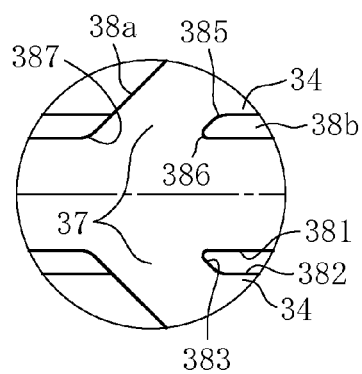

As a countermeasure, as illustrated in FIGS. 20(a) and 20(b), it is desired that the corner portions 385, 386, and 387 be each formed into a round shape. With this, the stress concentration that may occur at each of the corner portions 385, 386, and 387 can be suppressed, and a tensile strength of each of the tongue portions 34 (leaves 14) can be increased. As a result, durability of the foil member 13 can be enhanced. All the corner portions 385, 386, and 387 may be formed into the round shape. Alternatively, only the corner portion 386 that is acute and particularly liable to generate the stress concentration may be formed into the round shape while the other corner portions 385 and 387 are formed to be angular.

Note that, the above-mentioned round shape of the circumferential slit 38b, which is formed as a countermeasure for the stress concentration, is applicable also to the belt-like foils 30 according to the embodiments illustrated in FIG. 6, FIG. 12(a), FIGS. 13(a) and 13(b), FIG. 17, and FIGS. 18(a) to 18(f).

In the case described above, the plurality of leaves 14 are coupled to each other integrally with the coupling portion 15, and the plurality of leaves 14 are formed of the single foil member 13. However, as illustrated in FIGS. 21(a) and 21(b) and FIGS. 22(a) and 22(b), the present invention is applicable also to a case where the leaves 14 are formed of independent foil members 13. In this case, the rear end 14b of each of the foil members 13 comprises the mounting portion 13a that is formed to mount the foil members 13 to the outer member 11. The mounting portions 13a of the foil members 13 are fixed to the outer member 11. With this, the leaves 14 are formed at a plurality of positions in the circumferential direction.

Also in this embodiment, the front end 14a of each of the leaves 14 is inclined with respect to the axial direction so that the pressure gradient in the axial direction is generated in the radial bearing gaps C. In addition, the high-pressure portions in the radial bearing gaps C can be distributed continuously in the circumferential direction. With this, the shaft 6 is stably rotated. Further, the rear end 14b may be similarly inclined to form an inclined step portion at a boundary portion between the top foil Tf and the back foil Bf. With this, an inclined air flow moves along the step portion.

Figure 21A:
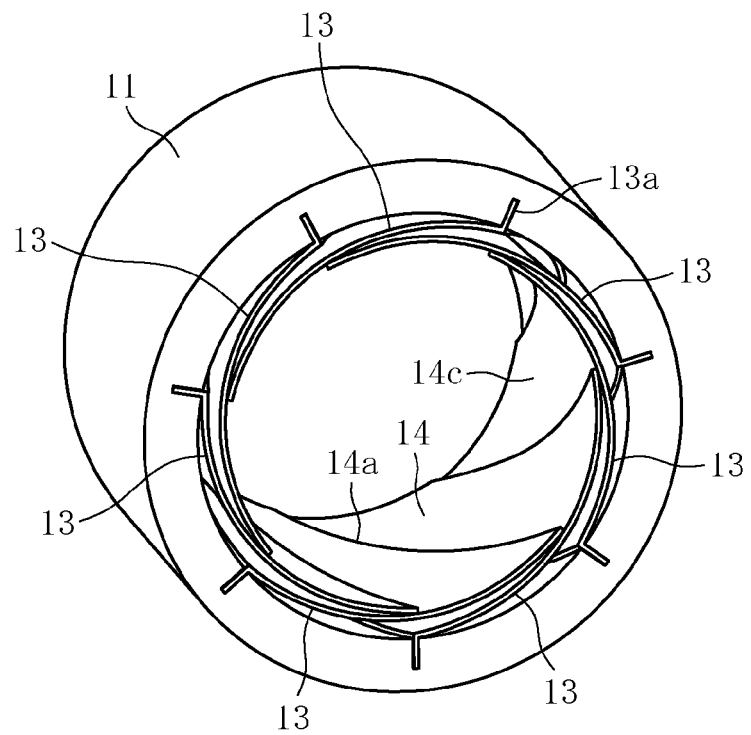
FIG. 21a is a perspective view of a foil bearing according to yet another embodiment of the present invention.
Figure 21B:
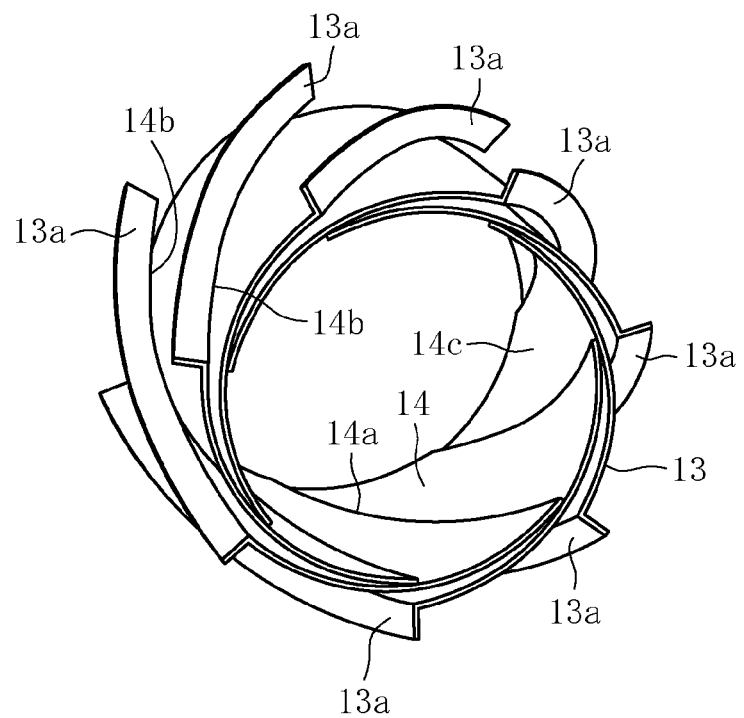
FIG. 21b is a perspective view of a foil assembly that is used in this foil bearing.

In FIGS. 21(a) and 21(b), the inclined directions of the front end 14a and the rear end 14b are limited to only one side so as to increase the pressure gradient to the one side. Meanwhile, FIGS. 22(a) and 22(b) exemplify a case where the front ends 14a are each formed into a V-shape by inclined parts 14a1 and 14a2 of two types that are inclined in opposite directions, and similarly, the rear ends 14b are each formed into a V-shape by inclined parts 14b1 and 14b2 of two types that are inclined in opposite directions. With this, a pressure gradient can be formed in a manner that pressure is increased toward a central portion in the axial direction of each of the bearing surfaces 14c. Further, the inclined air flows generated in conformity with the shape of the rear end 14b at the boundary portion between the top foil Tf and the back foil Bf merge with each other at a central part in the axial direction of each of the bearing surfaces 14c. Thus, the load capacity can be increased. The V-shaped front end 14a and rear end 14b illustrated in FIGS. 22(a) and (b) are applicable also to the foil members 13, 131, and 132 according to the embodiments illustrated in FIG. 3, FIG. 8, FIG. 10, FIG. 12, and FIG. 15.

Figure 23:
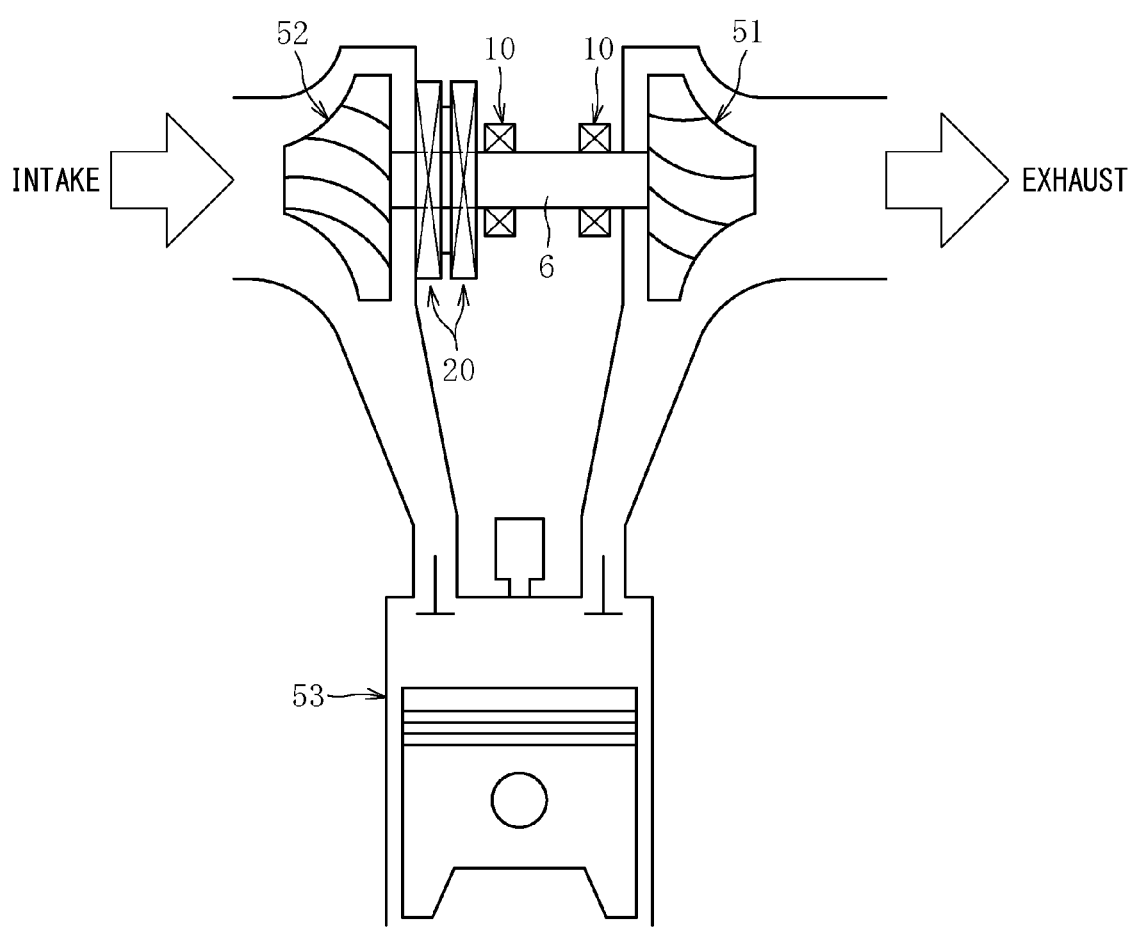
FIG. 23 is a schematic side view of a mechanism of a supercharger.

The foil bearings 10 according to the present invention are applicable not only to the micro gas turbine described above, and may be used as a bearing for supporting rotors of other turbo-machines such as a supercharger. As illustrated in FIG. 23, in the supercharger, a turbine 51 is driven with an exhaust gas generated in an engine 53, and a compressor 52 is rotated by a drive force thus generated, to thereby compress intake air. This configuration enables the engine 53 to generate higher torque and have higher efficiency. The turbine 51, the compressor 52, and the shaft 6 serve as a rotor, and the foil bearings 10 of the embodiments described above can be used as the radial bearings 10 for supporting the shaft 6.

The foil bearing according to the present invention can be used not only in the micro turbine or the supercharger, but widely used also as bearings for vehicles such as an automobile, which are used under restrictions such as a difficulty in lubricating with a liquid such as a lubricating oil, a difficulty in separately providing an auxiliary device of a lubricating oil circulatory system in view of energy efficiency, or problems that may be caused by shearing resistance of the liquid. The foil bearing according to the present invention can be widely used also as bearings for industrial devices.

The present invention is not limited to the embodiments described above, and various modifications may be made thereto. For example, unlike the cases exemplified in the above description, both the front end 14a and the rear end 14b of each of the leaves 14 need not be inclined with respect to the axial direction. Only any one of the front end 14a and the rear end 14b may be inclined, and another of the front end 14a and the rear end 14b may be formed parallel to the axial direction. Further, unlike the exemplified cases where all the leaves 14 and the coupling portion 15 are formed of the single foil member 13, all the leaves 14 need not necessarily be formed of the single foil member 13. For example, the leaves 14 may be obtained by forming the single foil member 13 into two leaves 14 and a coupling portion 15 for coupling the two leaves 14 to each other, and connecting a plurality of the foil members 13 to each other in the circumferential direction into a cylindrical shape.

Further, the foil bearings described above are each an air dynamic pressure bearing that uses air as a pressure generating fluid. However, the present invention is not limited thereto, and the foil bearings may be used as a hydraulic dynamic pressure bearing that uses a lubricating oil as the pressure generating fluid. In addition, unlike the exemplified cases where any one of the shaft 6 and the outer member 11 is used as a rotary side member and another of the shaft 6 and the outer member 11 is used as a fixed side member, both of those members may be used as rotary side members that are rotated at different speeds.

The invention claimed is:

1. A foil bearing, comprising:
    a cylindrical outer member;
    a shaft inserted on an inner periphery of the cylindrical outer member; and
    a plurality of leaves arranged at a plurality of positions in a circumferential direction between an inner peripheral surface of the cylindrical outer member and an outer peripheral surface of the shaft, the plurality of leaves each comprising a front end and a rear end that are spaced apart from each other in the circumferential direction, the front end serving as a free end,
    wherein a region comprising the front end of each of the plurality of leaves serves as a top foil portion that has a bearing surface,
    wherein a region comprising the rear end of each of the plurality of leaves serves as a back foil portion that supports, from behind, the top foil portion of an adjacent one of the plurality of leaves,
    wherein relative rotation of the shaft and the cylindrical outer member is supported by a fluid film formed in a radial bearing gap facing the bearing surface, and
    wherein both of the front end and the rear end of each of the plurality of leaves are inclined with respect to an axial direction.

2. The foil bearing according to claim 1, further comprising a foil member arranged between the outer peripheral surface of the shaft and the inner peripheral surface of the cylindrical outer member, the foil member comprising a coupling portion for coupling the plurality of leaves to each other, the foil member integrally comprising the plurality of leaves and the coupling portion.

3. The foil bearing according to claim 2,
    wherein the foil member is rounded, and comprises:
        a first end, which is mounted to the cylindrical outer member or the shaft; and
        a second end that serves as a free end, and
    wherein a turning direction of the foil member from the first end toward the second end is reversed with respect to a direction from the rear end toward the front end of each of the plurality of leaves.

4. The foil bearing according to claim 3, further comprising a double-layer foil portion comprising a first foil and a second foil that are overlapped with each other in a radial direction,
    wherein the first foil comprises a plurality of first leaves formed by slits that are provided in the first foil,
    wherein the second foil comprises a plurality of second leaves formed by slits that are provided in the second foil, and wherein the plurality of first leaves are inserted between adjacent ones of the plurality of second leaves through a plurality of spaces formed by the slits.

5. The foil bearing according to claim 4,
wherein the foil member is formed by rolling a belt foil comprising a plurality of slits, and
wherein the belt foil comprises:
a belt portion that forms the coupling portion; and
a plurality of tongue portions that form the plurality of leaves, the belt portion and the plurality of tongue portions being formed by the plurality of slits.

6. The foil bearing according to claim 5, wherein the plurality of slits of the belt foil comprises a plurality of slits that divide the plurality of tongue portions and the belt portion from each other and that comprise corner portions each formed into a round shape.

7. The foil bearing according to claim 3,
wherein the foil member is formed by rolling a belt foil comprising a plurality of slits, and
wherein the belt foil comprises:
a belt portion that forms the coupling portion; and
a plurality of tongue portions that form the plurality of leaves, the belt portion and the plurality of tongue portions being formed by the plurality of slits.

8. The foil bearing according to claim 7, wherein the plurality of slits of the belt foil comprises a plurality of slits that divide the plurality of tongue portions and the belt portion from each other and that comprise corner portions each formed into a round shape.

9. The foil bearing according to claim 3,
wherein any one of the cylindrical outer member and the shaft serves as a fixed side member,
wherein another of the cylindrical outer member and the shaft member serves as a rotary side member, and
wherein frictional coefficients of at least two of a sliding portion between the fixed side member and the foil member, a sliding portion between the rotary side member and the foil member, or a sliding portion between parts of the foil member are different from each other.

10. The foil bearing according to claim 2, further comprising a double-layer foil portion comprising a first foil and a second foil that are overlapped with each other in a radial direction,
wherein the first foil comprises a plurality of first leaves formed by slits that are provided in the first foil,
wherein the second foil comprises a plurality of second leaves formed by slits that are provided in the second foil, and
wherein the plurality of first leaves is inserted between adjacent ones of the plurality of second leaves through a plurality of spaces formed by the slits.

11. The foil bearing according to claim 10,
wherein the foil member is formed by rolling a belt foil comprising a plurality of slits, and
wherein the belt foil comprises:
a belt portion that forms the coupling portion; and
a plurality of tongue portions that form the plurality of leaves, the belt portion and the plurality of tongue portions being formed by the plurality of slits.

12. The foil bearing according to claim 11, wherein the plurality of slits of the belt foil comprises a plurality of slits that divide the plurality of tongue portions and the belt portion from each other and that comprise corner portions each formed into a round shape.

13. The foil bearing according to claim 10,
wherein any one of the cylindrical outer member and the shaft serves as a fixed side member,
wherein another of the cylindrical outer member and the shaft member serves as a rotary side member, and
wherein frictional coefficients of at least two of a sliding portion between the fixed side member and the foil member, a sliding portion between the rotary side member and the foil member, or a sliding portion between parts of the foil member are different from each other.

14. The foil bearing according to claim 2,
wherein the foil member is formed by rolling a belt foil comprising a plurality of slits, and
wherein the belt foil comprises:
a belt portion that forms the coupling portion; and
a plurality of tongue portions that form the plurality of leaves, the belt portion and the plurality of tongue portions being formed by the plurality of slits.

15. The foil bearing according to claim 14, wherein the plurality of slits of the belt foil comprises a plurality of slits that divide the plurality of tongue portions and the belt portion from each other and that comprise corner portions each formed into a round shape.

16. The foil bearing according to claim 15,
wherein any one of the cylindrical outer member and the shaft serves as a fixed side member,
wherein another of the cylindrical outer member and the shaft member serves as a rotary side member, and
wherein frictional coefficients of at least two of a sliding portion between the fixed side member and the foil member, a sliding portion between the rotary side member and the foil member, or a sliding portion between parts of the foil member are different from each other.

17. The foil bearing according to claim 14,
wherein any one of the cylindrical outer member and the shaft serves as a fixed side member,
wherein another of the cylindrical outer member and the shaft member serves as a rotary side member, and
wherein frictional coefficients of at least two of a sliding portion between the fixed side member and the foil member, a sliding portion between the rotary side member and the foil member, or a sliding portion between parts of the foil member are different from each other.

18. The foil bearing according to claim 2,
wherein any one of the cylindrical outer member and the shaft serves as a fixed side member,
wherein another of the cylindrical outer member and the shaft member serves as a rotary side member, and
wherein frictional coefficients of at least two of a sliding portion between the fixed side member and the foil member, a sliding portion between the rotary side member and the foil member, or a sliding portion between parts of the foil member are different from each other.

19. The foil bearing according to claim 18, wherein a coating is interposed on all or a part of the sliding portions.

20. A turbo-machine, comprising a rotor that is supported by the foil bearing according to claim 1.

* * * * *